US012755724B2

(12) United States Patent
Inoue et al.

(10) Patent No.: US 12,755,724 B2
(45) Date of Patent: Oct. 6, 2026

(54) ELECTRONIC PERFORMANCE DEVICE

(71) Applicant: Ef-Note Inc., Hamamatsu (JP)

(72) Inventors: Kazuaki Inoue, Hamamatsu (JP); Yoshiaki Mori, Hamamatsu (JP)

(73) Assignee: Ef-Note Inc., Hamamatsu (JP)

( * ) Notice: Subject to any disclaimer, the term of this patent is extended or adjusted under 35 U.S.C. 154(b) by 905 days.

(21) Appl. No.: 17/994,493

(22) Filed: Nov. 28, 2022

(65) Prior Publication Data

US 2023/0090680 A1 Mar. 23, 2023

Related U.S. Application Data

(63) Continuation of application No. PCT/JP2021/025740, filed on Jul. 8, 2021.

(30) Foreign Application Priority Data

Jul. 13, 2020 (JP) ................................ 2020-119703

(51) Int. Cl.
*G10H 7/02* (2006.01)
*G10H 1/00* (2006.01)

(52) U.S. Cl.
CPC ............ *G10H 7/02* (2013.01); *G10H 1/0008* (2013.01); *G10H 2220/185* (2013.01); *G10H 2250/645* (2013.01)

(58) Field of Classification Search
CPC .. G10H 7/02; G10H 1/0008; G10H 2220/185; G10H 2250/645

(Continued)

(56) References Cited

U.S. PATENT DOCUMENTS 4,916,996 A * 4/1990 Suzuki .................. H03M 3/042 84/622
4,998,960 A * 3/1991 Rose .................... G10H 1/0008 84/DIG. 12

(Continued)

FOREIGN PATENT DOCUMENTS

JP S61-009693 A 1/1986
JP S619693 A * 1/1986

(Continued)

OTHER PUBLICATIONS

International Search Report dated Sep. 21, 2021 in corresponding PCT Application No. PCT/JP2021/025740.

*Primary Examiner* — Christina M Schreiber
(74) *Attorney, Agent, or Firm* — Harness, Dickey & Pierce, P.L.C.

(57) ABSTRACT

An electronic performance device includes a storage mechanism 1, a detection mechanism 2 and an output mechanism 3. The storage mechanism 1 is configured to store data waveforms per level of hit strength. The detection mechanism 2 is configured to transmit a detection signal at the time of hitting. The output mechanism 3 is configured to output data waveforms corresponding to the hit strength indicated by the detection signal. The storage mechanism 1 stores basic data waveforms corresponding to each level of strength of a hit on a musical instrument. An additional element that is produced based on waveform data extracted separately from the basic waveform data and applicable to multiple levels of the hit strength. The output mechanism 3 outputs output waveform data where the additional element is applied to the basic waveform data.

6 Claims, 18 Drawing Sheets

(58) Field of Classification Search
USPC .............................................................. 84/604
See application file for complete search history.

(56) References Cited

U.S. PATENT DOCUMENTS

| | | | | |
|---|---|---|---|---|
| 5,811,706 | A * | 9/1998 | Van Buskirk | G10H 7/002 84/645 |
| 6,235,980 | B1 * | 5/2001 | Sato | G10H 1/08 84/622 |
| 8,450,589 | B2 * | 5/2013 | Nakanishi | G06F 12/0246 84/602 |
| 2005/0257672 | A1 * | 11/2005 | Arimoto | G10H 7/008 84/738 |
| 2005/0262991 | A1 * | 12/2005 | Arimoto | G10H 1/06 84/735 |
| 2008/0066612 | A1 * | 3/2008 | Kaneko | G10H 7/02 84/661 |
| 2018/0275816 | A1 * | 9/2018 | Obata | G06F 3/0488 |
| 2018/0277070 | A1 * | 9/2018 | Mori | G10H 3/143 |
| 2021/0201874 | A1 * | 7/2021 | Takasaki | G10H 1/34 |
| 2021/0201880 | A1 * | 7/2021 | Kusumoto | G10H 7/02 |
| 2023/0090680 | A1 * | 3/2023 | Inoue | G10H 3/146 84/604 |

FOREIGN PATENT DOCUMENTS

| | | | | |
|---|---|---|---|---|
| JP | 2001109474 A | * | 4/2001 | |
| JP | 2006030474 A | * | 2/2006 | |
| JP | 2006133529 A | * | 5/2006 | |
| JP | 2018159770 A | * | 10/2018 | G06F 3/0488 |
| WO | WO-2018055892 A1 | * | 3/2018 | G10H 7/02 |
| WO | WO-2020226175 A1 | * | 11/2020 | G10H 3/143 |

* cited by examiner

[ Fig. 1 ]
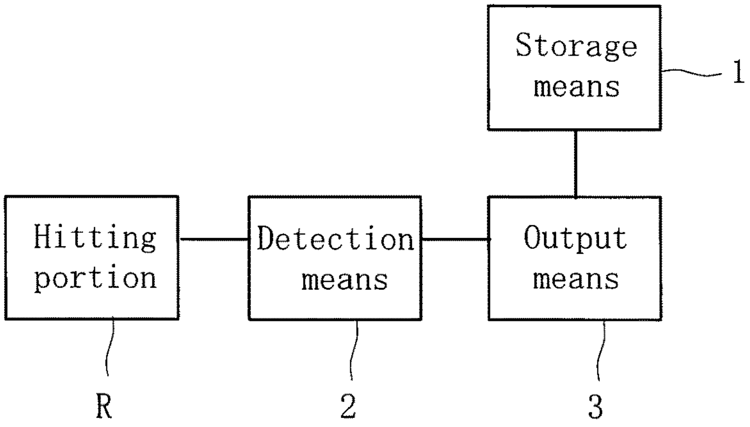
[ Fig. 2 ]
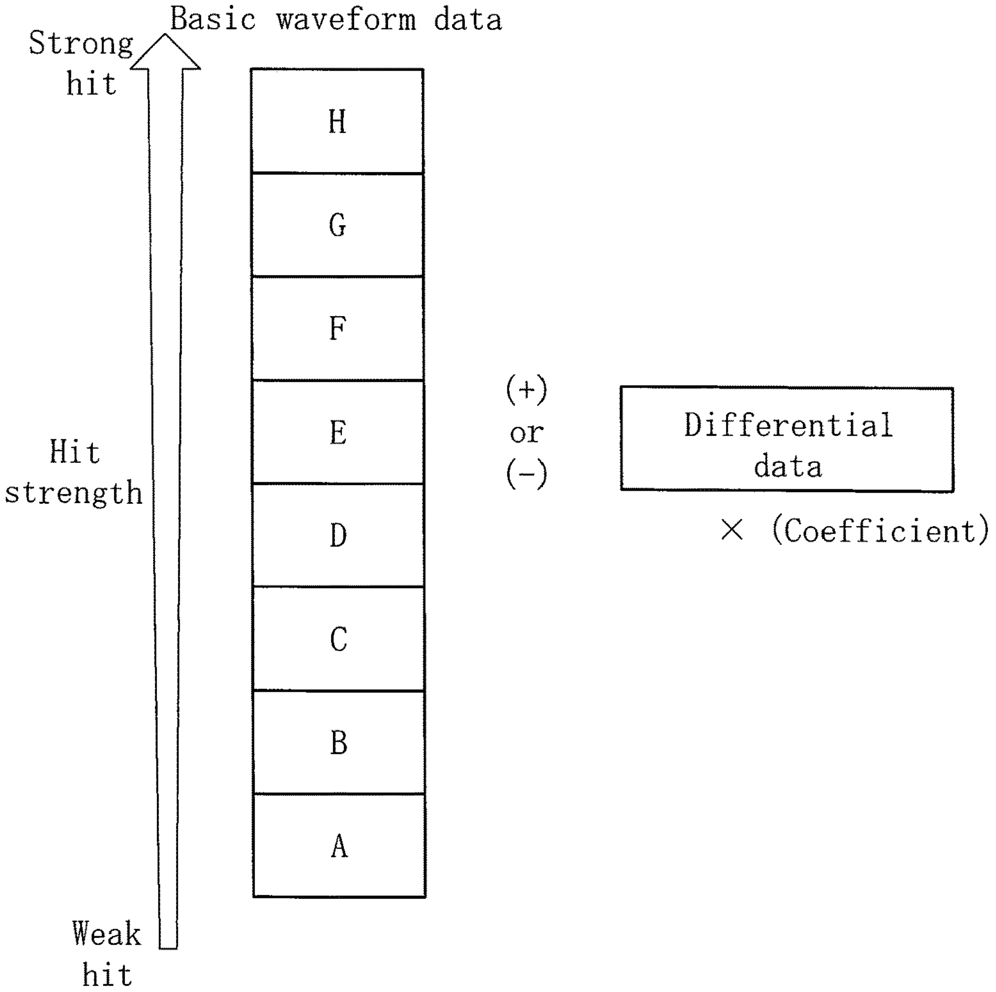

[ Fig. 3 ]
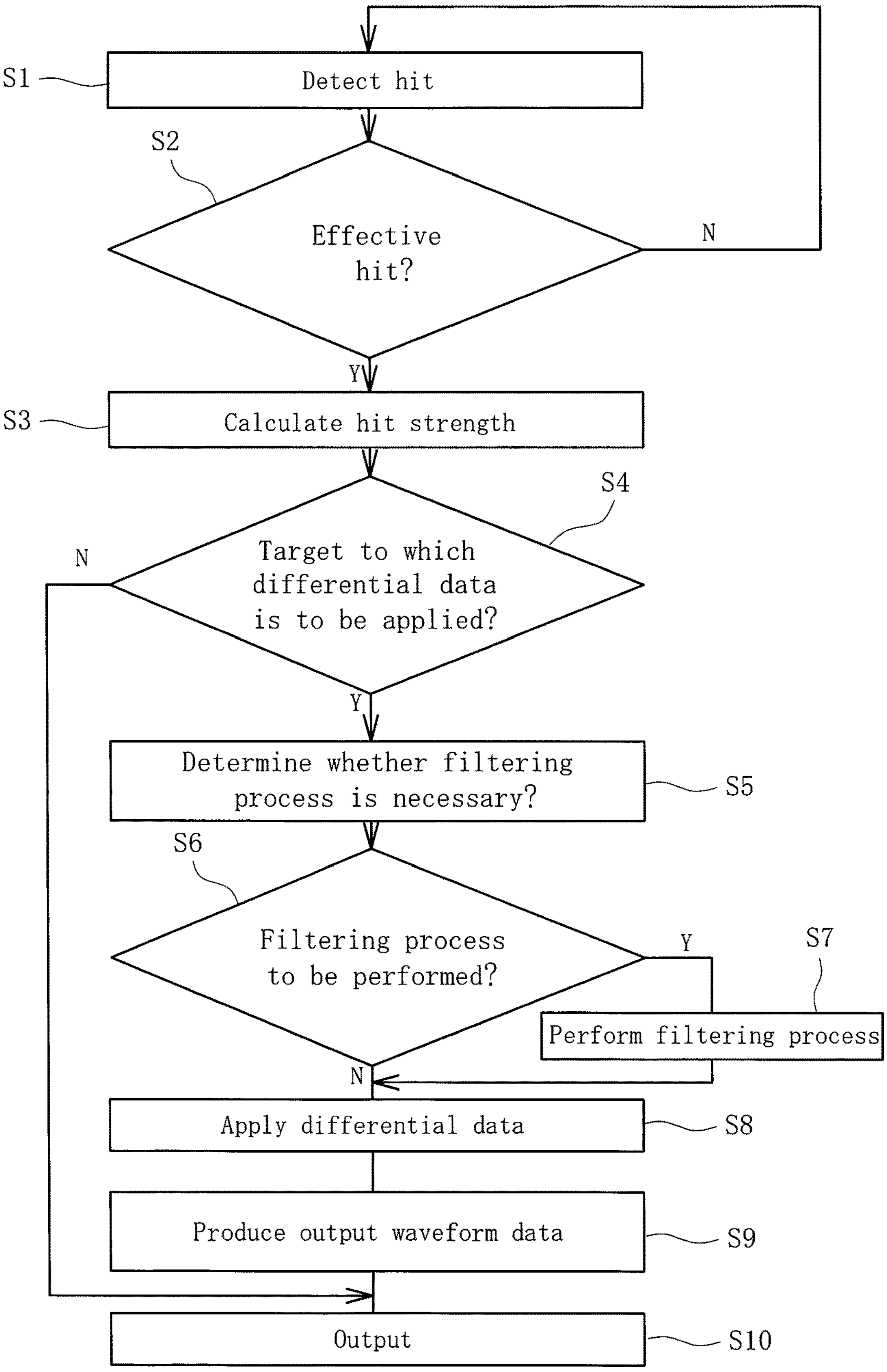

[ Fig. 4 ]
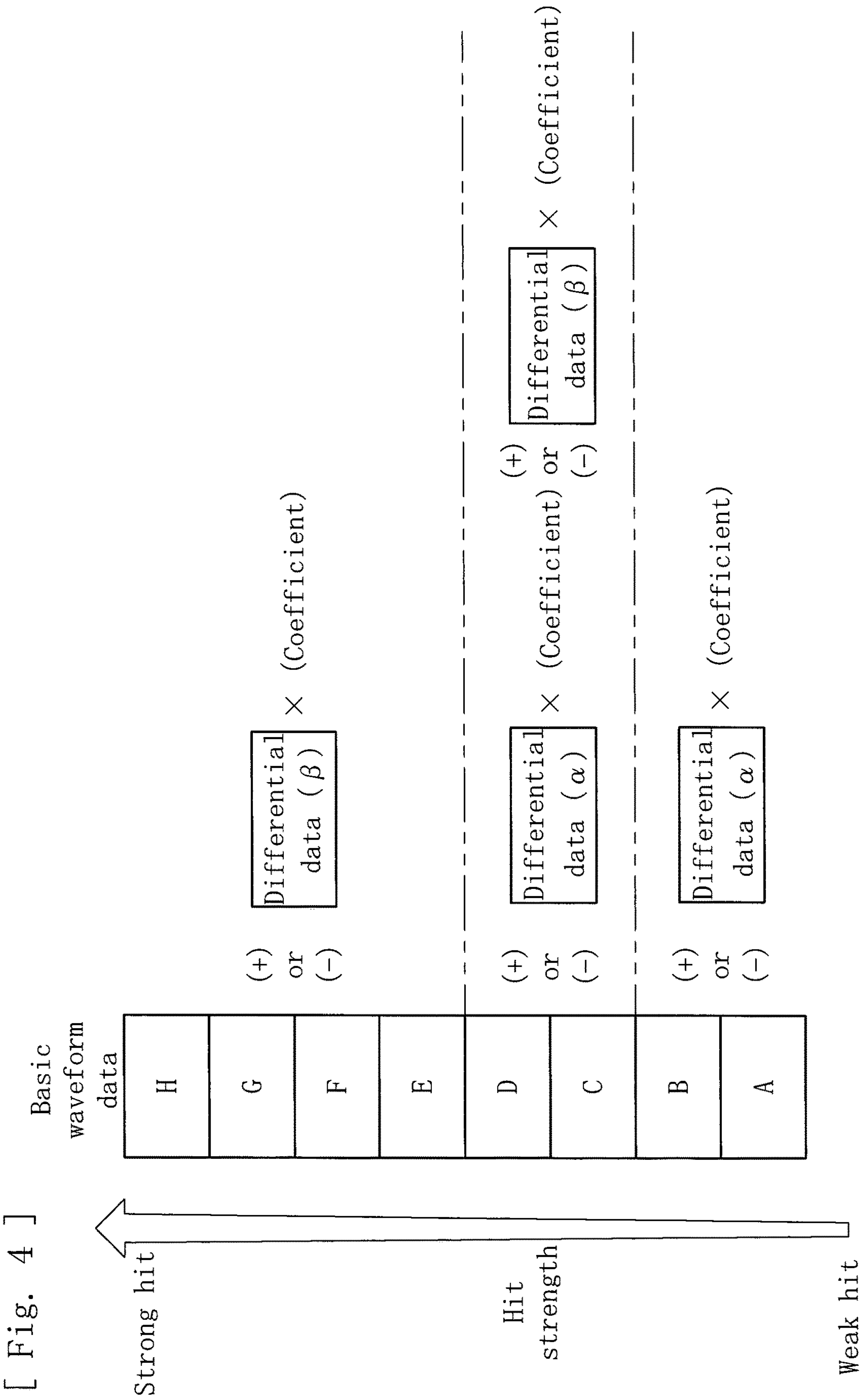

[ Fig. 5 ]
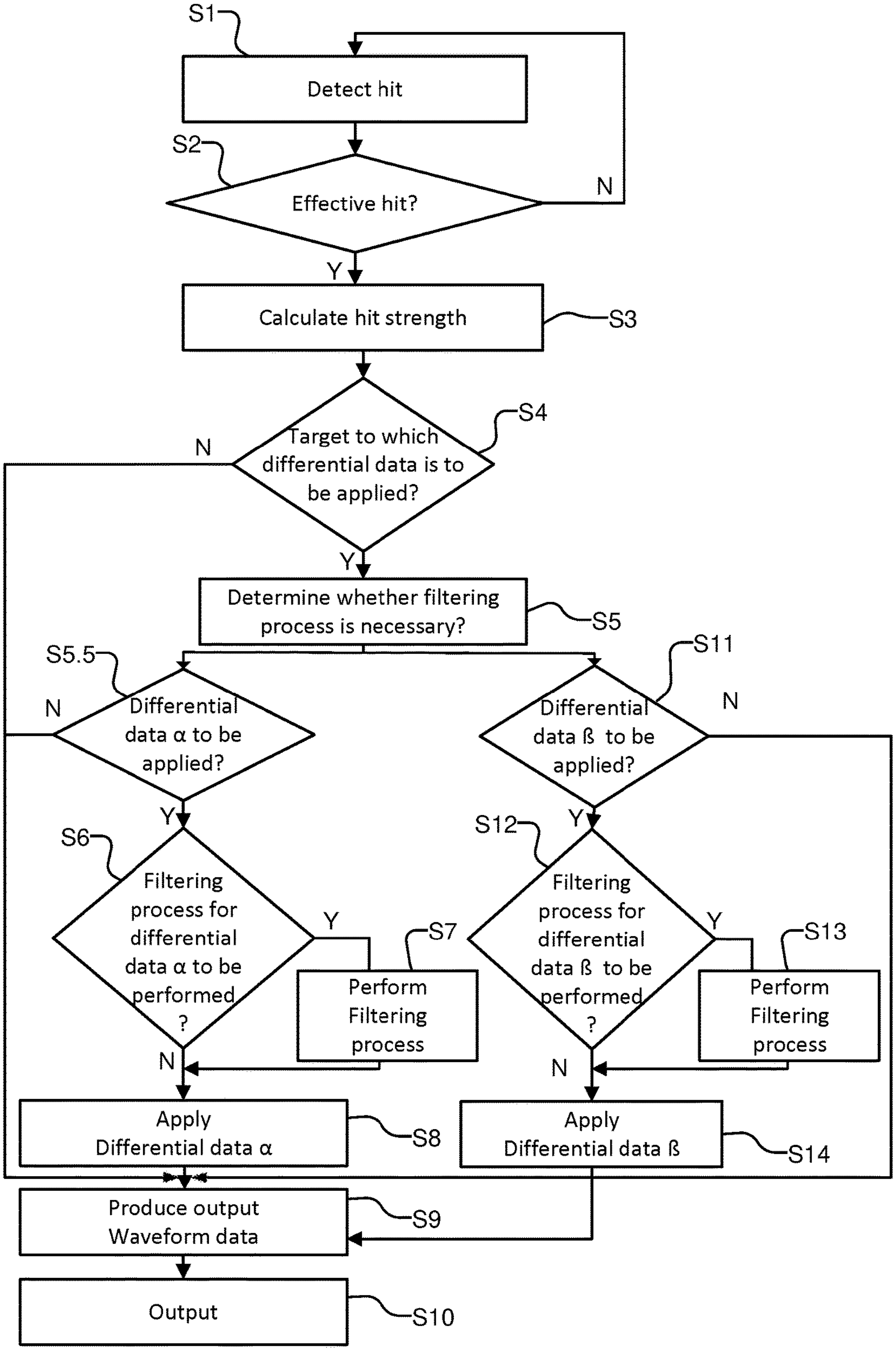

[ Fig. 6 ]
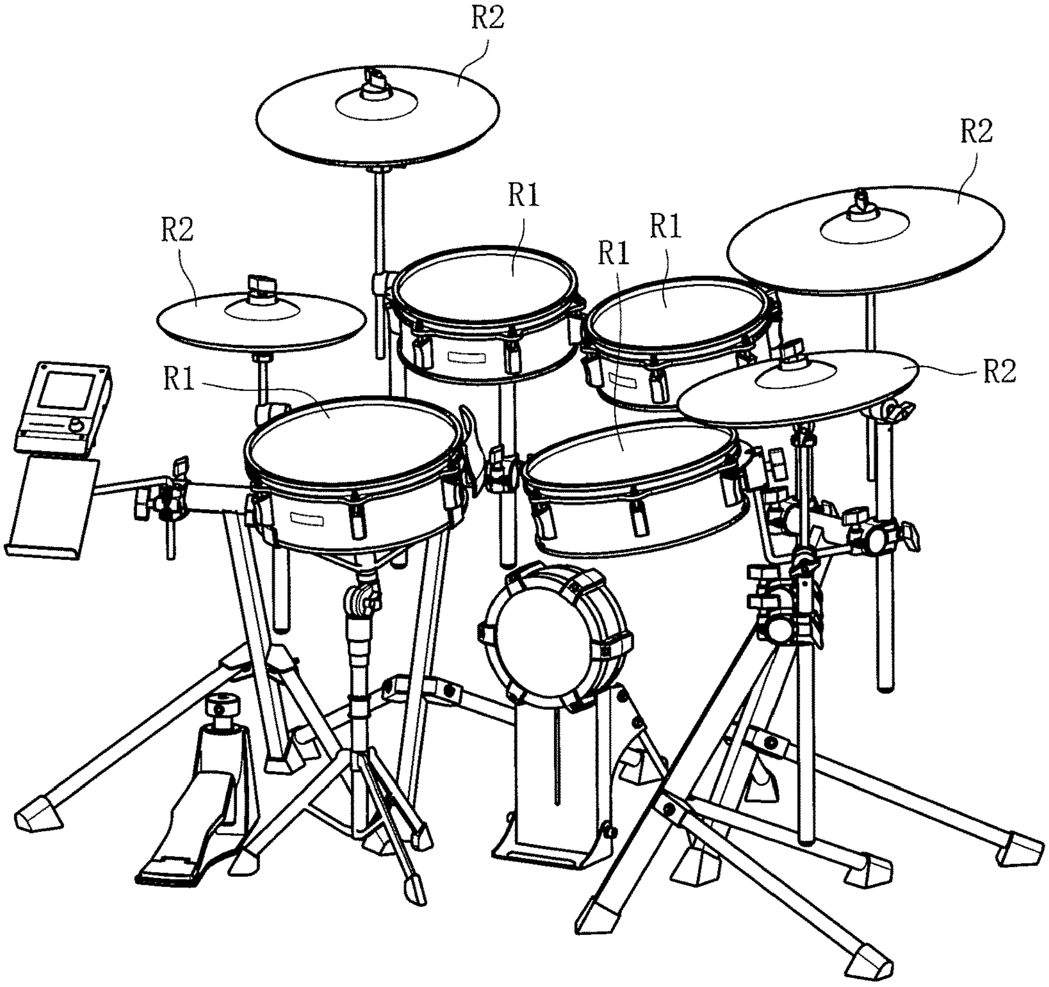
[ Fig. 7]
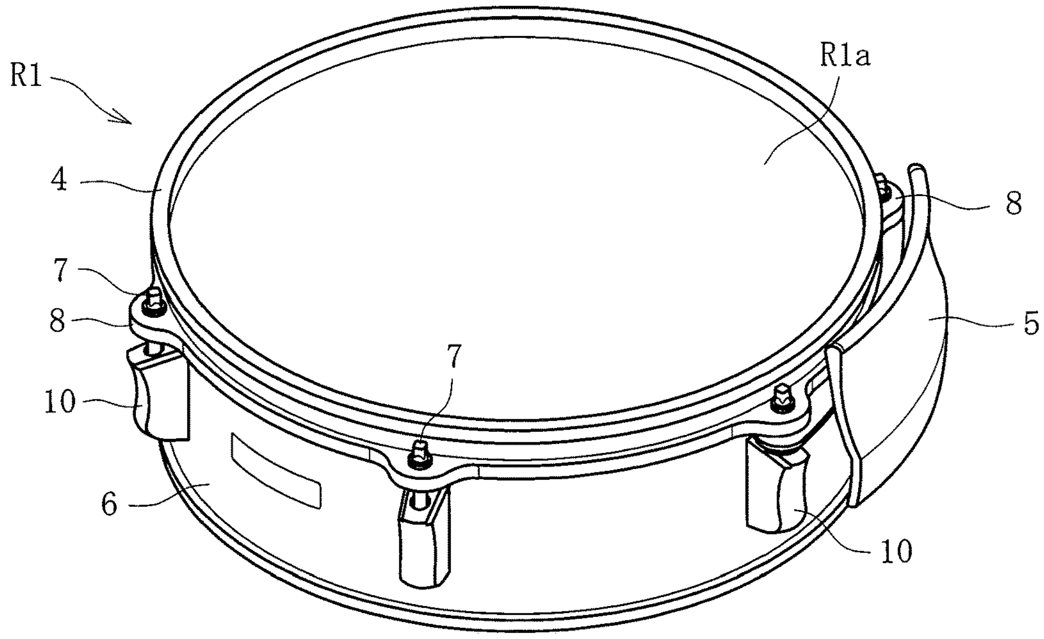

[ Fig. 8 ]
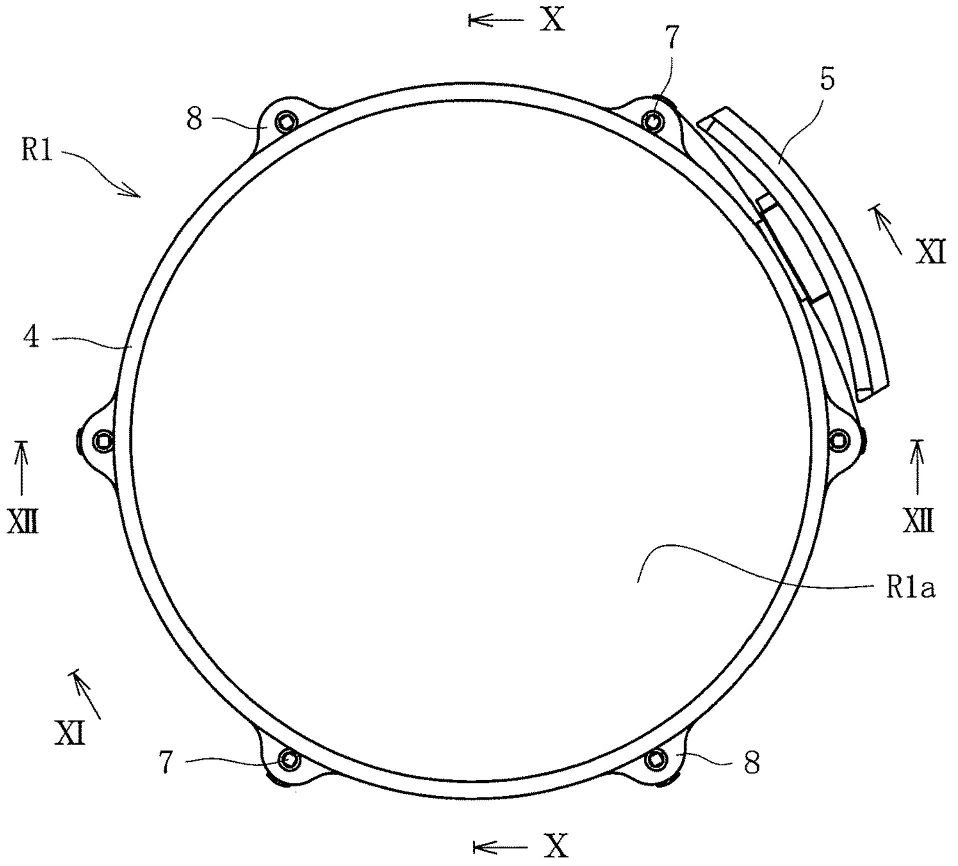
[ Fig. 9 ]
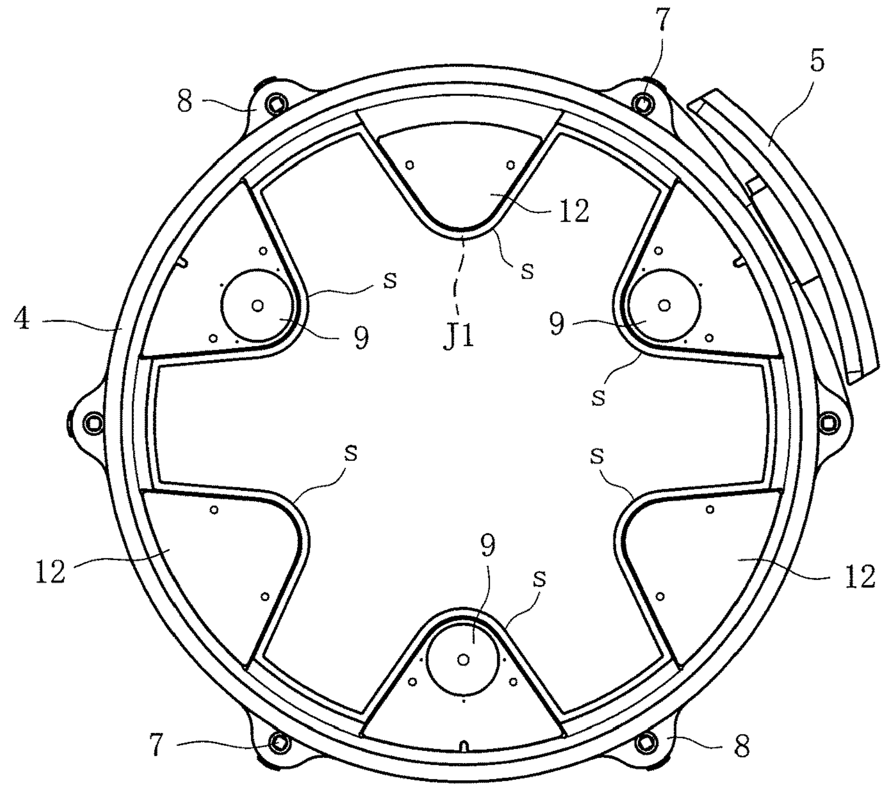

[ Fig. 10 ]
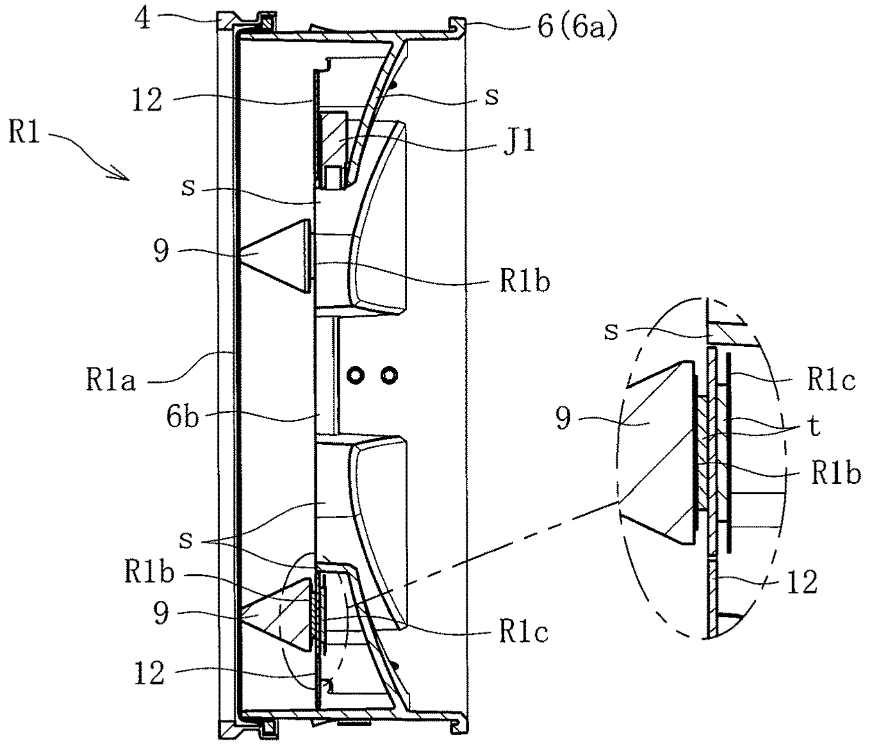
[ Fig. 11 ]
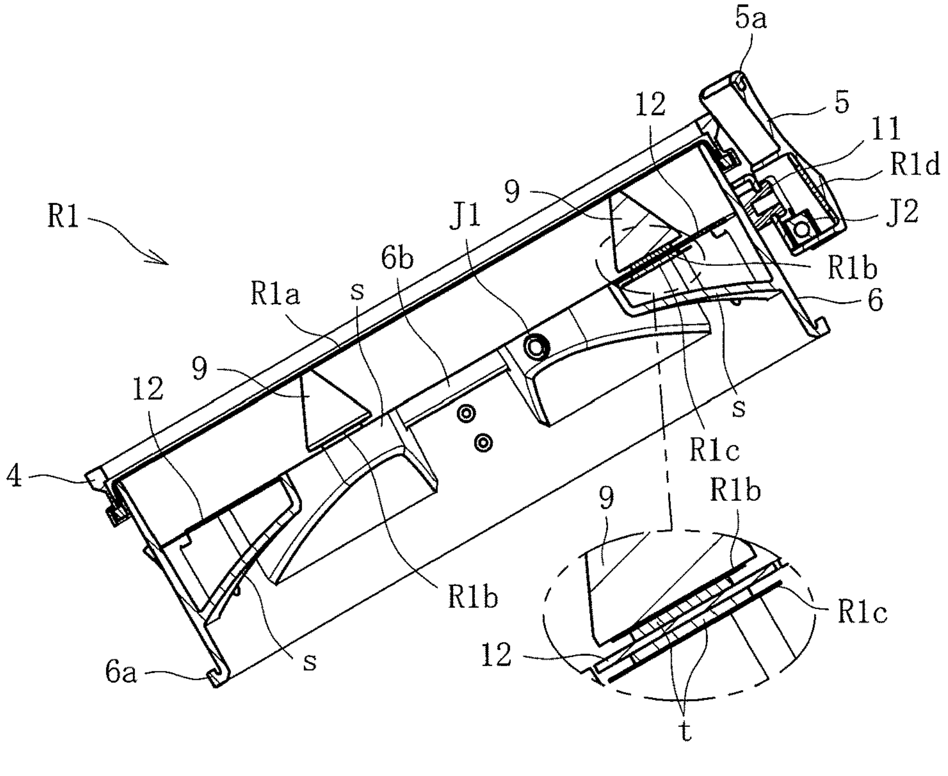

[ Fig. 12 ]
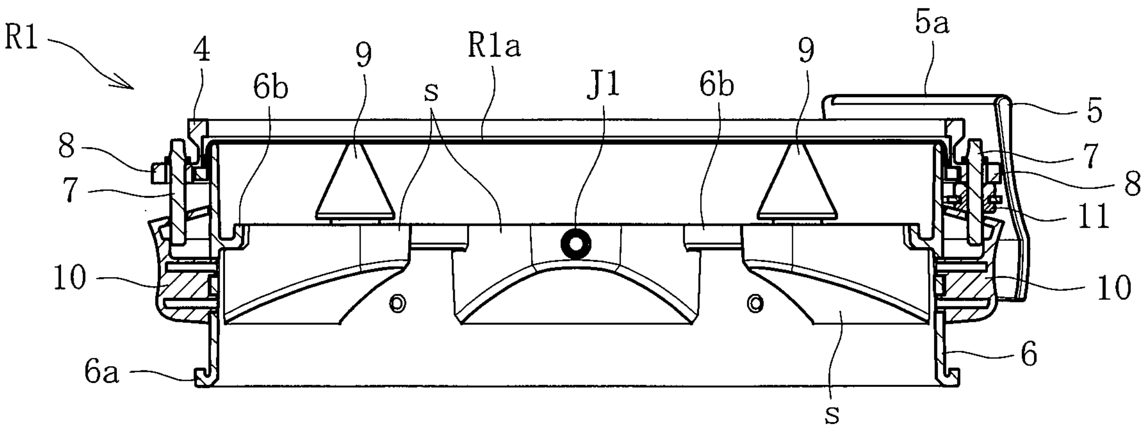

[ Fig. 13 ]
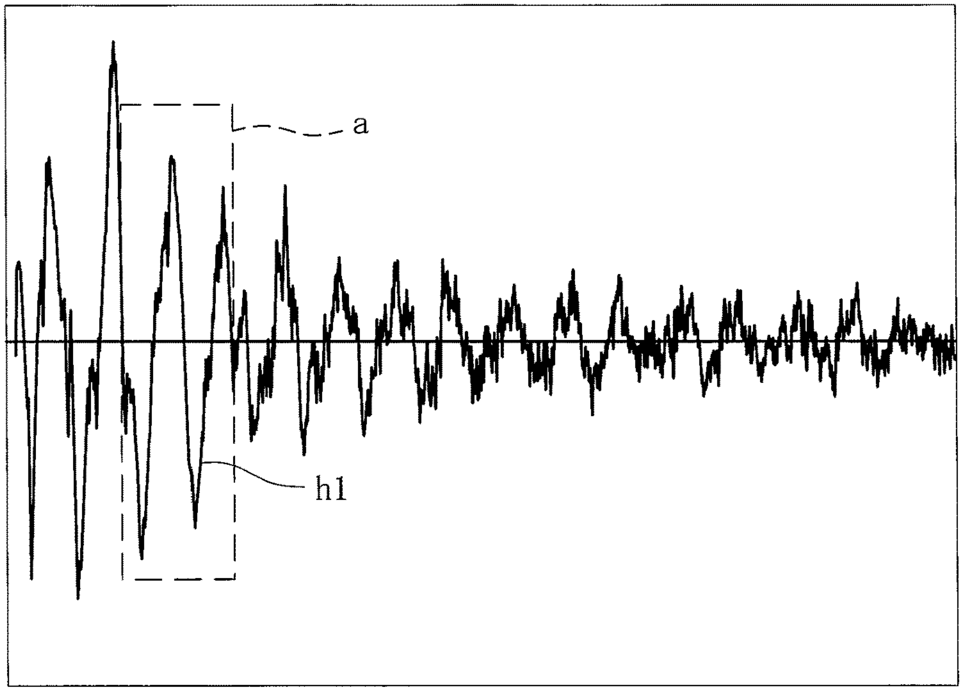
[ Fig. 14 ]
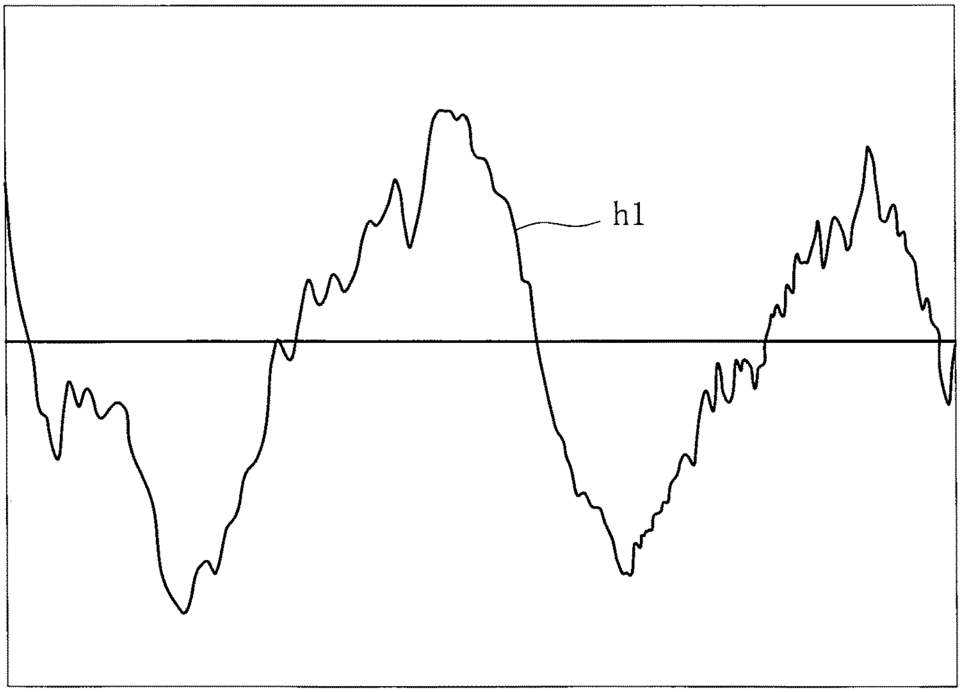

[ Fig. 15 ]
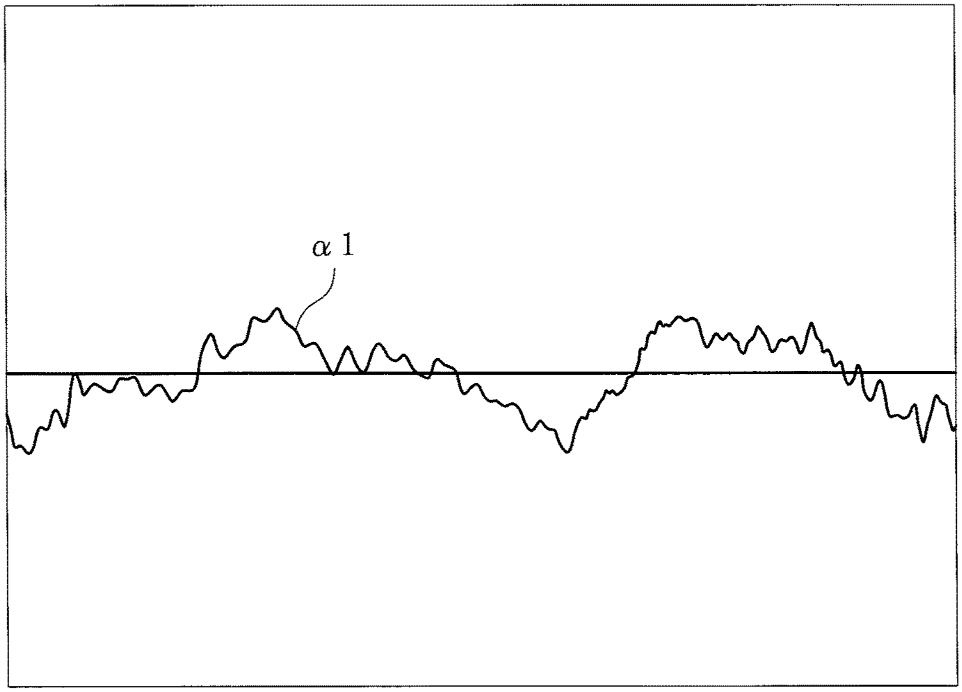
[ Fig. 16 ]
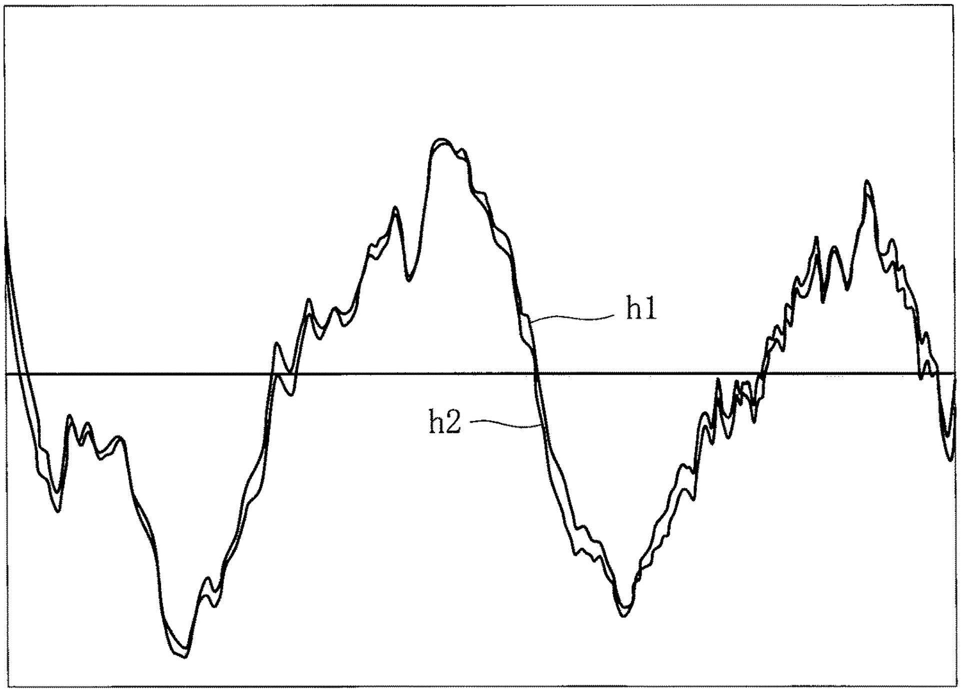

[ Fig. 17 ]
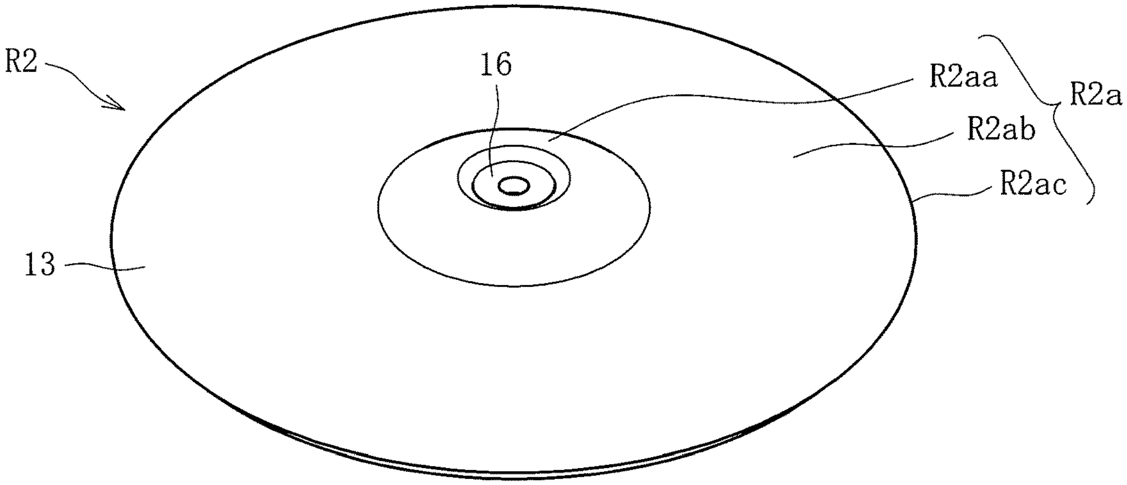
[ Fig. 18 ]
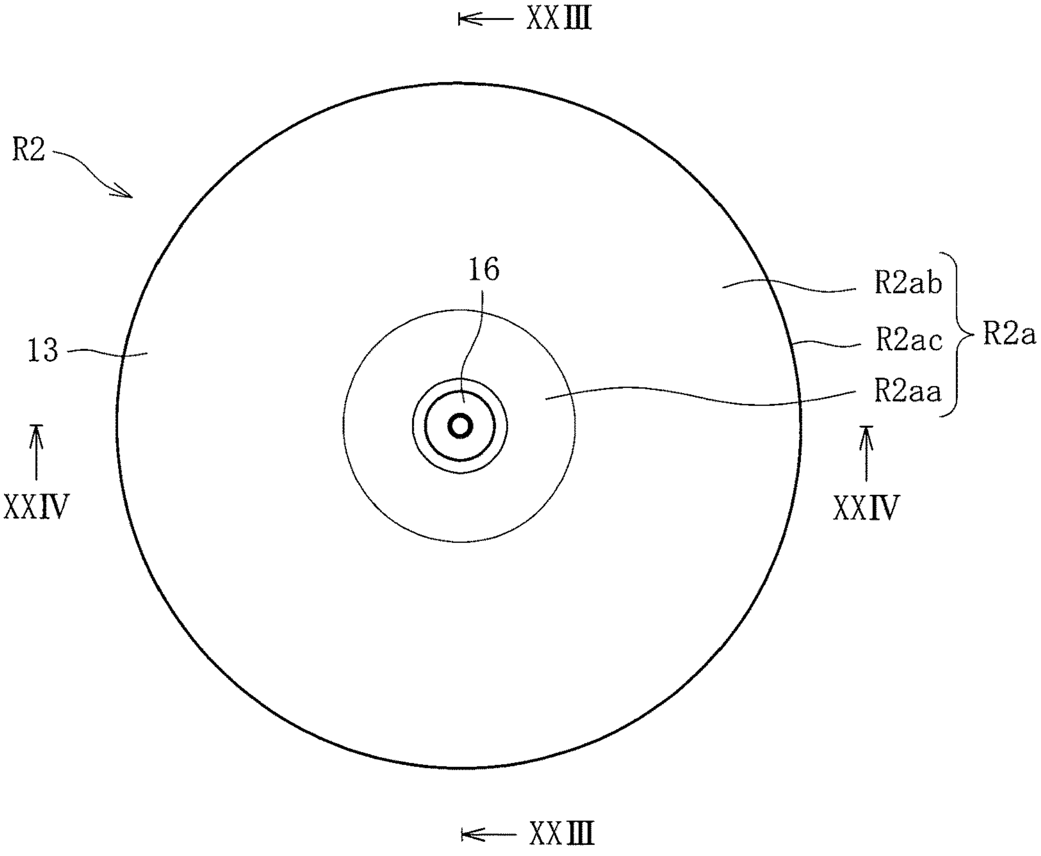

[ Fig. 19 ]
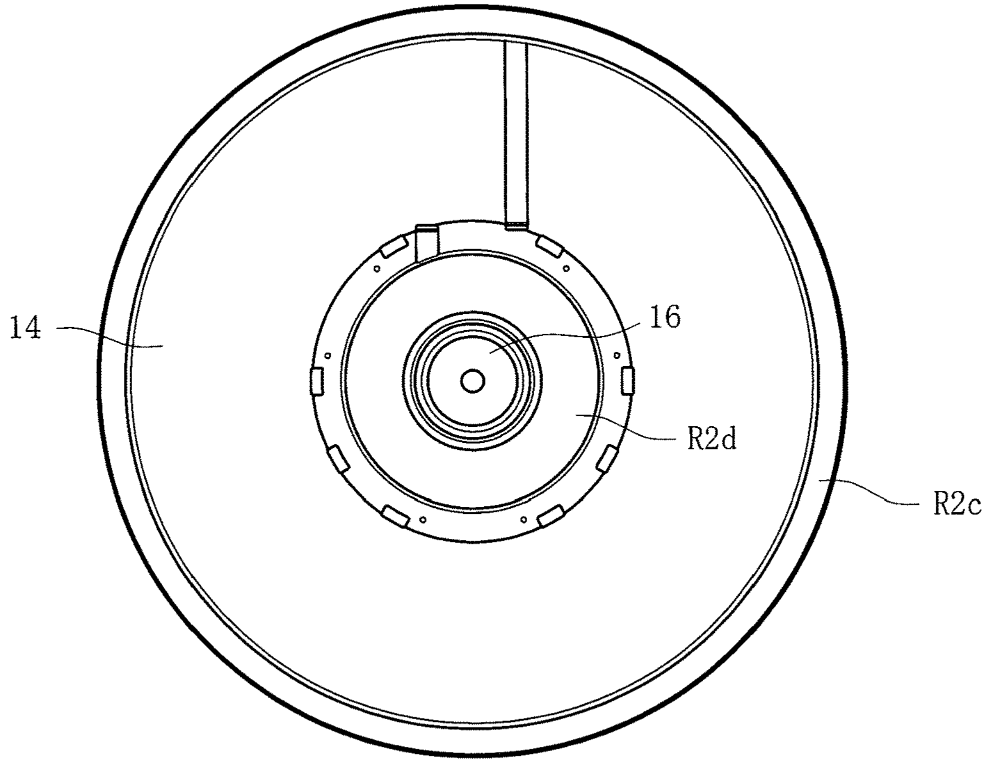
[ Fig. 20 ]
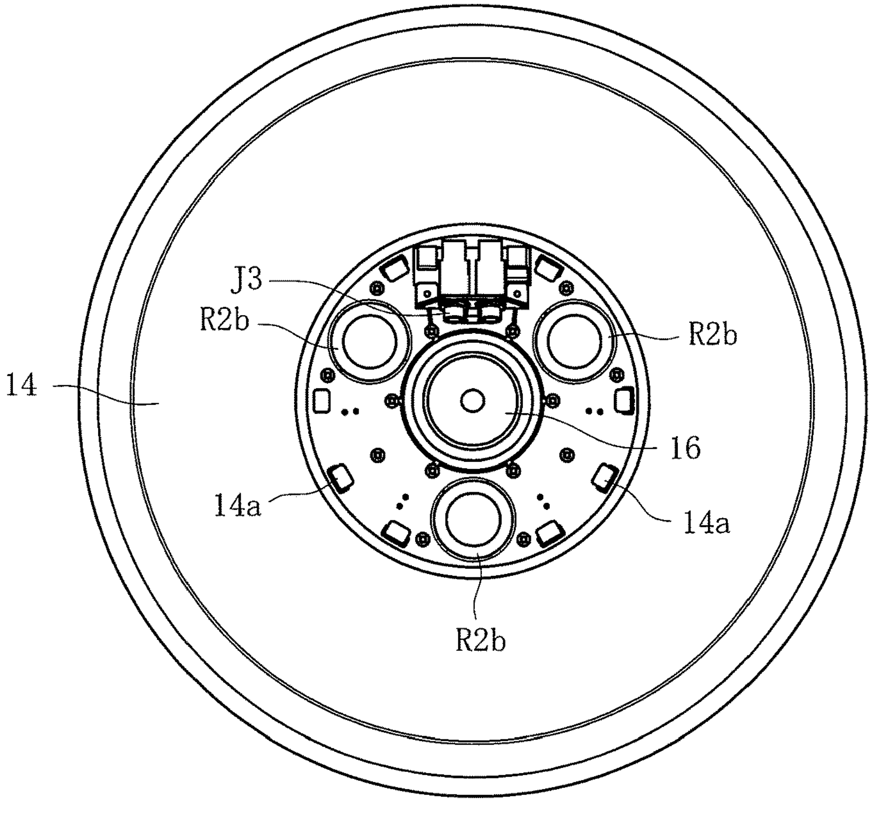

[ Fig. 21 ]
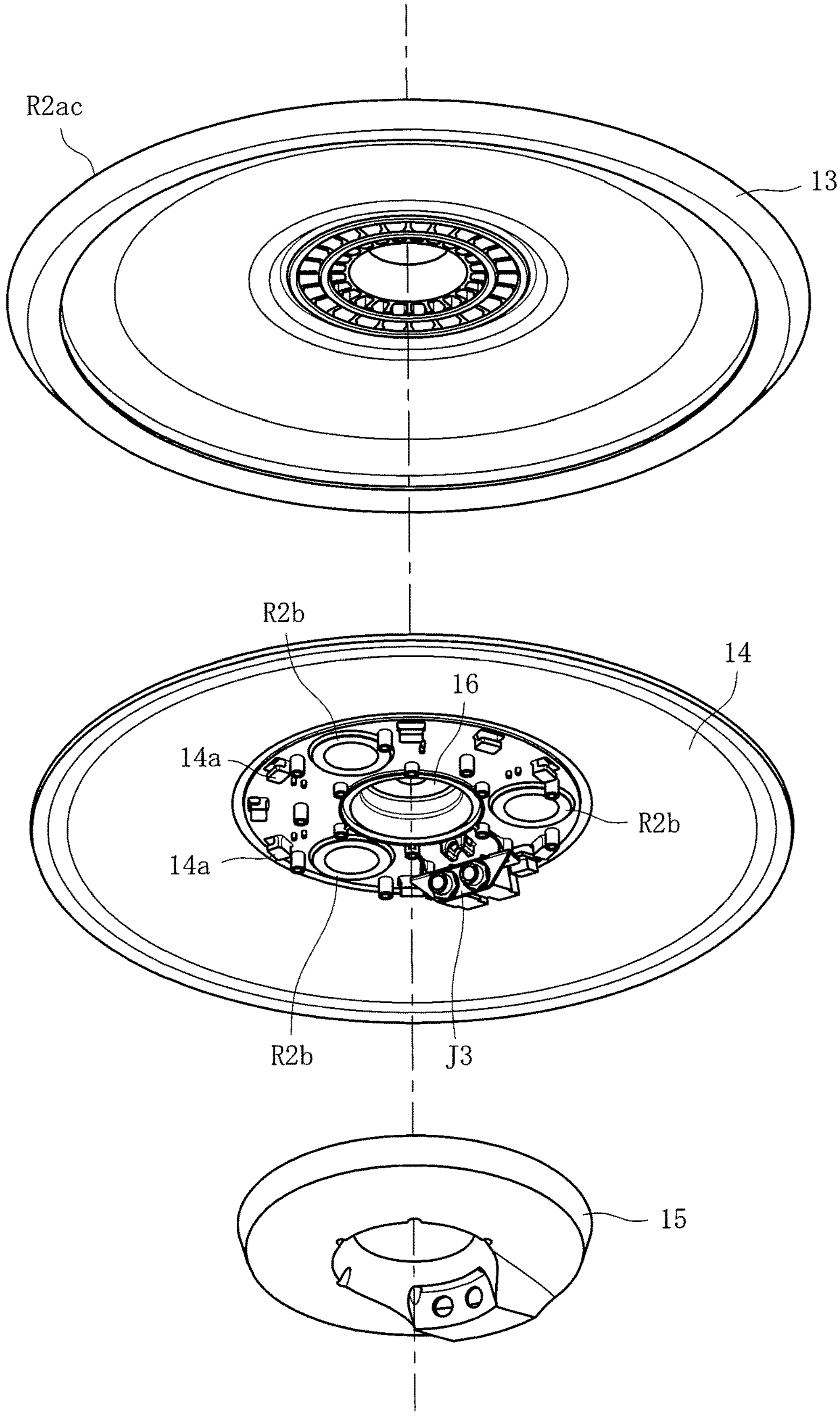

[ Fig. 22 ]
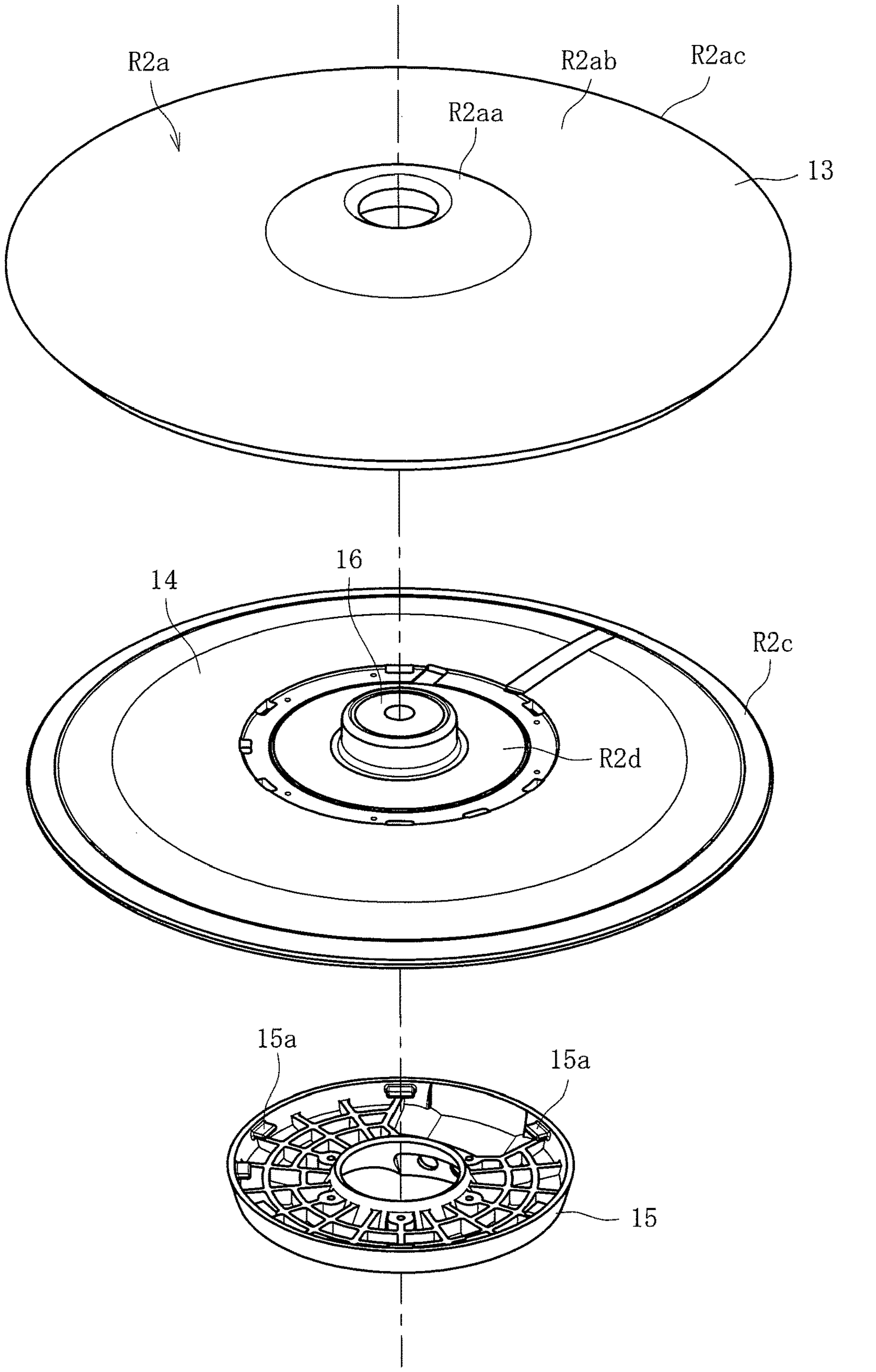

[ Fig. 23 ]
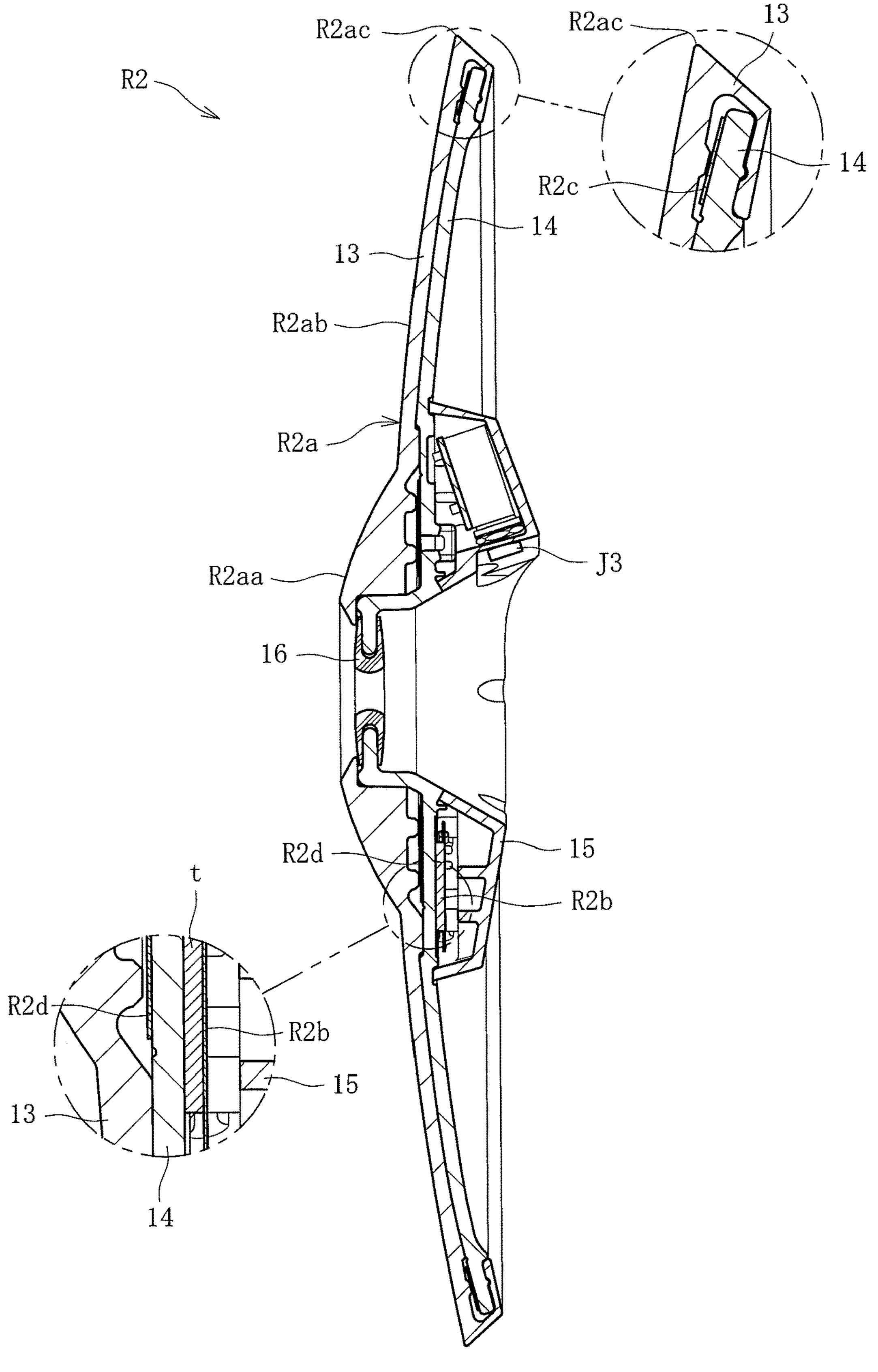

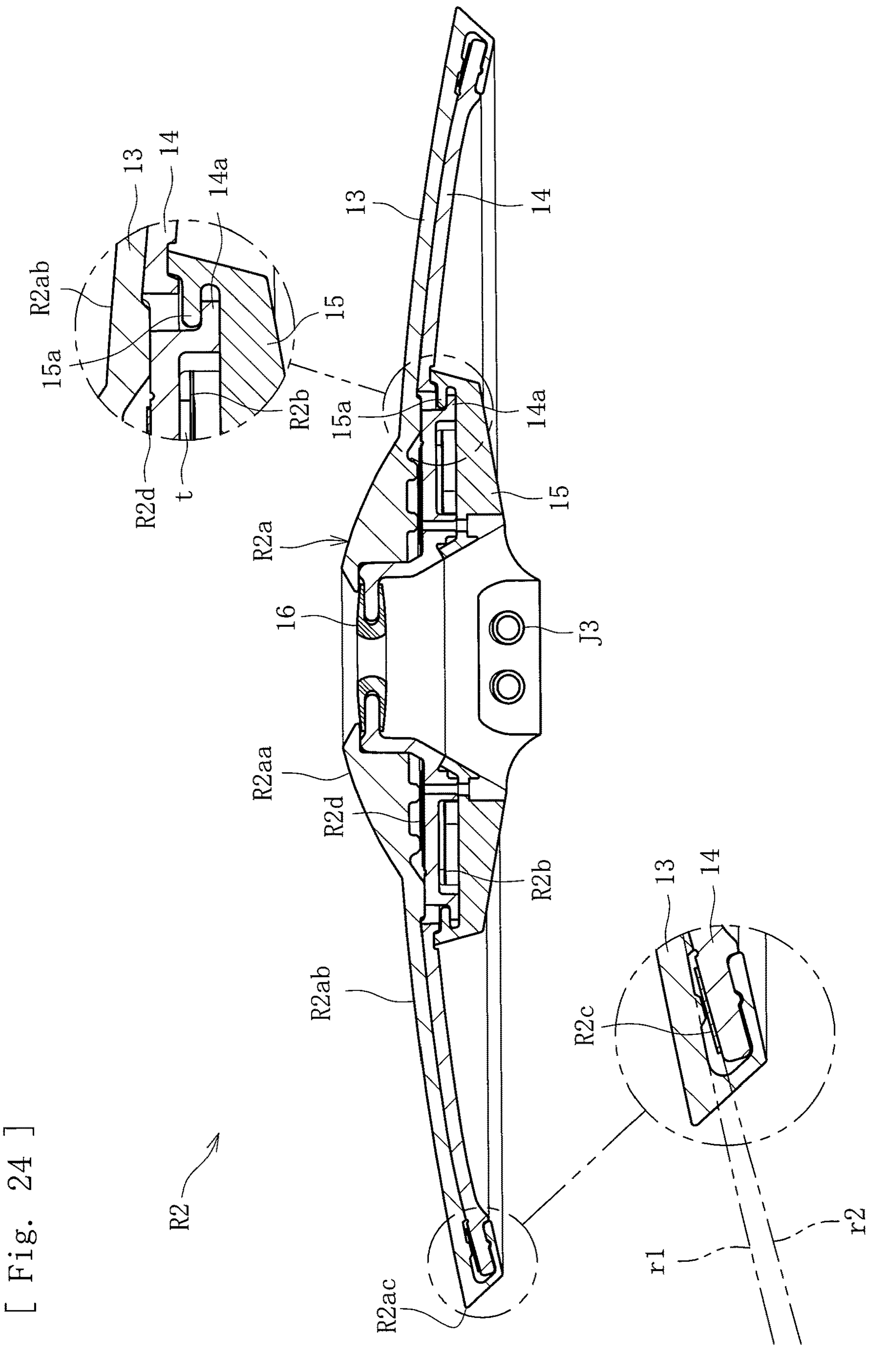
[ Fig. 24 ]

[ Fig. 25 ]
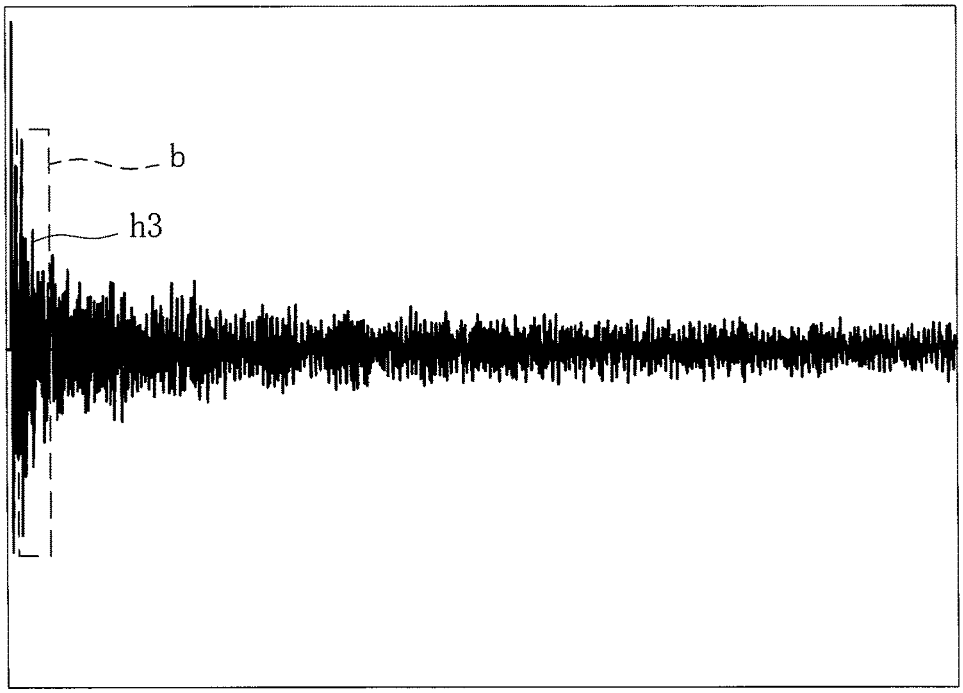
[ Fig. 26 ]
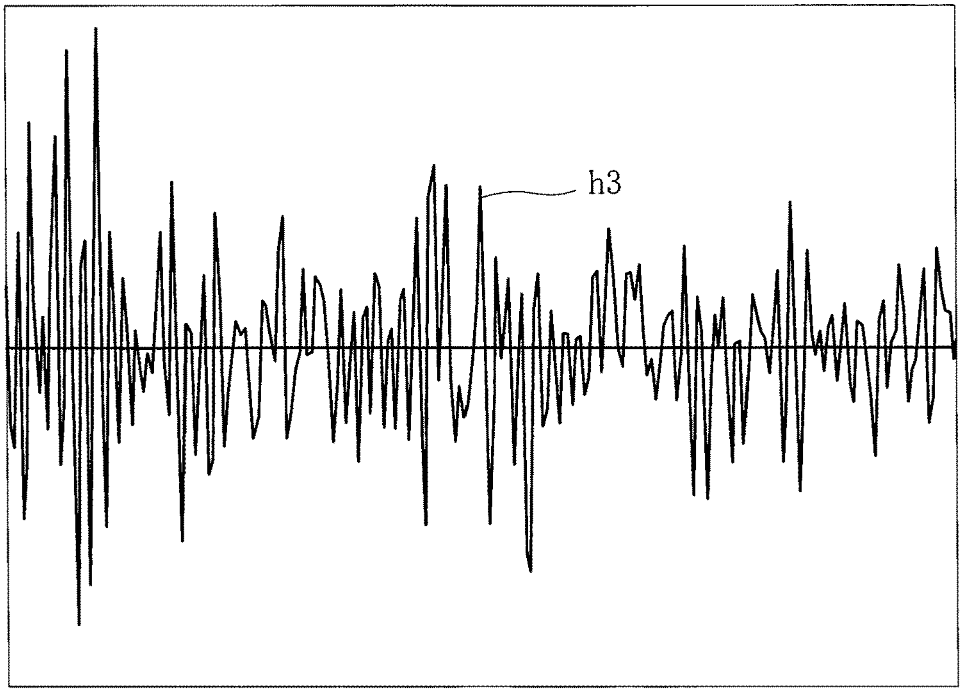

[ Fig. 27 ]
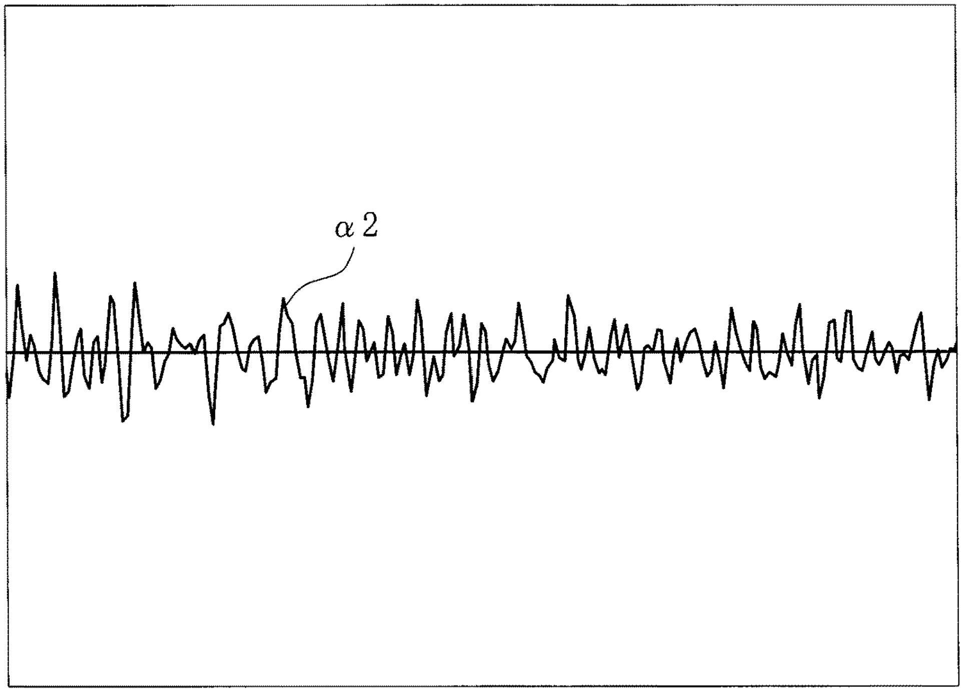
[ Fig. 28 ]
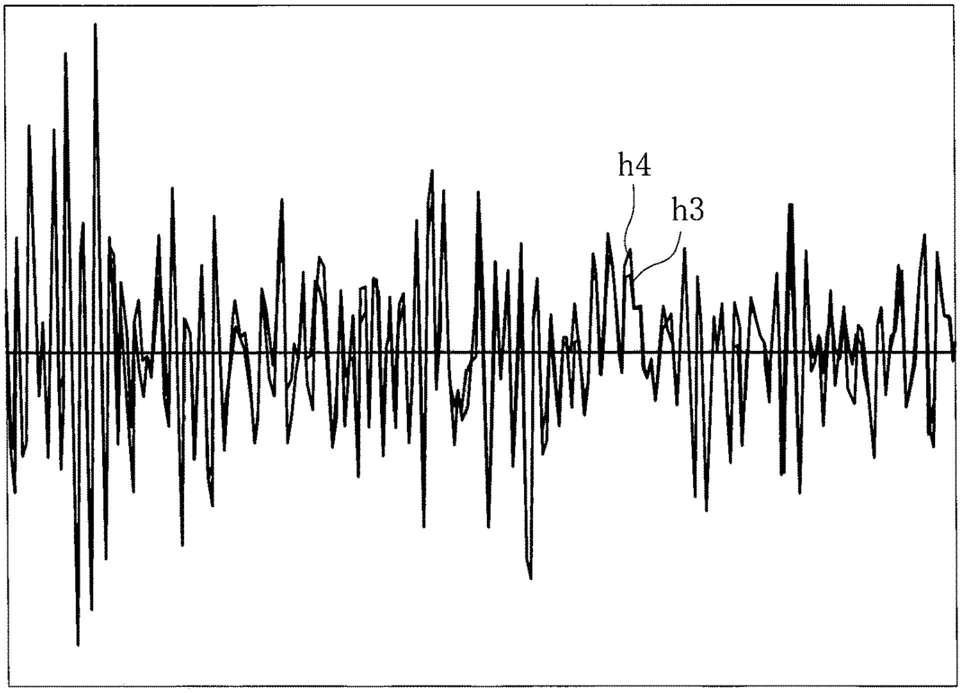

ELECTRONIC PERFORMANCE DEVICE

CROSS-REFERENCE TO RELATED APPLICATIONS

This application is a continuation of International Application No. PCT/JP2021/025740, filed Jul. 8, 2021, which claims priority to Japanese Application No. 2020-119703, filed Jul. 13, 2020. The disclosures of the above applications are incorporating herein by reference.

FIELD

The present disclosure relates to an electronic performance device capable of outputting waveform data corresponding to hit strength.

BACKGROUND

An ordinary electronic performance device is configured to, for a particular natural musical instrument such as an acoustic drum or an acoustic cymbal, previously store waveform data obtained at the time of hitting and to output the previously stored waveform data upon detection of hitting during a performance. In this case, during a roll performance (i.e., a performance of repeating fine hits on a hitting surface), for example, the same waveform data is repeatedly output in a monotonous fashion. This may give the impression that the performance is monotonous.

To cope with the above-described problem, an electronic performance device has, so far, been proposed as disclosed in Patent Literature Japanese Unexamined Patent Application Publication No. 2006-30474, for example. In the disclosed electronic performance device, for a natural musical instrument, multiple waveform data are previously stored per level of hit strength. Thus, during a performance, the waveform data corresponding to the hit strength is selected and output in accordance with a predetermined algorithm (random numbers). That related art can avoid the monotony in the roll performance and can electronically create hitting sounds closer to those generated by the natural musical instrument. As another prior-art example, Japanese Unexamined Patent Application Publication No. S61-9693 discloses a music sound generator capable of obtaining a music sound waveform signal by combining a reference waveform and a residual waveform.

The above-described related art (disclosed in Japanese Unexamined Patent Application Publication No. 2006-30474) seems to be able to avoid the monotony in the performance, but it needs storage with a large memory area because of the necessity of previously storing the multiple waveform data per level of the hit strength for the natural musical instrument. Furthermore, because each waveform data per level of the hit strength needs to be edited into an optimum state for the performance, a disadvantage exists that requires editing work that not only need skill, but also a lot of time.

The other above-described related art (disclosed in Japanese Unexamined Patent Application Publication No. S61-9693) has the following problem. Even when the residual waveform is changed by shifting a filter or timing, for example, and the changed residual waveform is added to the reference waveform, the expression of music sounds does not change because the residual waveform does not include variation elements that are inherent to sounds generated by humans or natural musical instruments. This results in a disadvantage that sounds generated with repeated hitting sound similar. Particularly, the above-mentioned related art needs to produce residual data for each strength group in a manner to produce soft-sound residual data for a weak hit and strong-sound residual data for a strong hit.

SUMMARY

The present disclosure has been made in consideration of the above-described situation. It provides an electronic performance device that produces output waveform data with application of an additional element regardless of hit strength. This very naturally avoids monotony of a performance while reducing an amount of information of waveform data to be stored and an editing work time.

An electronic performance device comprises a storage mechanism configured to previously store waveform data per level of hit strength obtained at the time of hitting a musical instrument, a hitting portion to be hit during a performance, a detection mechanism configured to detect a hit on the hitting portion during the performance and to transmit a detection signal related to at least the hit strength at the time of hitting. Also, an output mechanism is configured to output the waveform data stored in the storage mechanism. The waveform data corresponds to the hit strength indicated by the detection signal on condition of receiving the detection signal from the detection mechanism. The storage mechanism stores basic waveform data that corresponds to each level of strength of the hit on the musical instrument. At least one additional element is produced based on waveform data extracted from sounds of the musical instrument separately from the basic waveform data and is applicable to multiple levels of the hit strength. The output mechanism outputs output waveform data produced by applying the additional element to the basic waveform data.

In the electronic performance device, the additional element is produced based on differential data that is given by extracting a difference between two waveform data obtained at comparable hit strengths.

In the electronic performance device, the additional element is obtained by multiplying the differential data by a predetermined coefficient.

In the electronic performance device, a variety of analogous output waveform data are produced by, for the basic waveform data at a predetermined level of the hit strength, freely changing timing to apply the additional element, or by executing an envelope process that accompanies with an increase or a decrease of a sound volume, or a filtering process with which the additional element is applied to only a predetermined sound range.

In the electronic performance device, the output mechanism is configured to output multiple output waveform data, produced by applying the additional element, at random or as per preset.

In the electronic performance device, the detection mechanism detects various parameters different from strength of a hit on the hitting portion during the performance. The parameters include a hit position of the hitting portion, a time interval between hits, and a pressure applied to the hitting portion. The detection mechanism obtains the additional element, based on at least one of the detected values, and produces the output waveform data.

In the electronic performance device, the storage mechanism stores multiple additional elements and selects one of the additional elements, the one being applied, according to the strength of the hit on the hitting portion.

According to the disclosure, the storage mechanism stores the basic waveform data corresponding to each level of the strength of the hit on the musical instrument. The additional element is produced based on waveform data extracted from sounds of the musical instrument separately from the basic waveform data and is applicable to multiple levels of the hit strength. The output mechanism outputs the output waveform data that is produced by applying the additional element to the basic waveform data. Thus, since the output waveform data is produced by applying the additional element regardless of the hit strength, monotony of the performance can be very naturally avoided while an amount of information of the waveform data to be stored and an editing work time are reduced.

The additional element is produced based on the differential data that is given by extracting a difference between two waveform data obtained at comparable hit strengths. The output waveform data is natural and analogous to the basic waveform data and can be easily produced. Particularly, since a variation inherent to sounds generated by humans or natural musical instruments is extracted as a differential between the comparable hit strengths, the expression of music sounds can be naturally changed by applying such a differential to the basic waveform data and producing the output waveform data.

The additional element is obtained by multiplying the differential data by the predetermined coefficient. Variations of the produced output waveform data are increased, and a more natural performance can be realized. Since only the differential data obtained by extracting the variation inherent to the sounds generated by the humans or the natural musical instruments is multiplied by the coefficient, the sound texture of the basic waveform data is maintained. Thus, deterioration is minimized in the sound texture of the output waveform data.

A variety of analogous output waveform data are produced by, for the basic waveform data at the predetermined level of the hit strength, freely changing the timing to apply the additional element, or by executing the envelope process that accompanies with an increase or a decrease of the sound volume, or by the filtering process where the additional element is applied to only the predetermined sound range. Therefore, the variations of the produced output waveform data can be further increased. Thus, deterioration in texture of music sounds is remarkably suppressed in comparison with a method of executing the filtering process on the basic waveform data itself to give variations.

The output mechanism is configured to output the multiple output waveform data. The data is produced by applying the additional element, at random or as per preset. Thus, the appropriate output waveform data can be smoothly output during the performance.

The detection mechanism detects various parameters different from the strength of the hit on the hitting portion during the performance. The parameters include the hit position of the hitting portion, the time interval between hits, and the pressure applied to the hitting portion. The detection mechanism obtains the additional element based on at least one of the detected values and produces the output waveform data. Therefore, natural change in the output waveform data, in match with inherent behaviors of the musical instrument, can be obtained.

The storage mechanism stores the multiple additional elements and selects one of the additional elements, the one being applied, according to the strength of the hit on the hitting portion. The appropriate output waveform data according to the hit strength can be output.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a block diagram of an electronic performance device.

FIG. 2 is a schematic view illustrating basic waveform data per level of hit strength and differential data, the data being used in the electronic performance device.

FIG. 3 is a flowchart representing a control process executed by the electronic performance device.

FIG. 4 is a schematic view illustrating basic waveform data per level of hit strength and differential data, the data being used in the electronic performance device according to another embodiment.

FIG. 5 is a flowchart representing a control process executed by the electronic performance device according to the other embodiment.

FIG. 6 is a schematic view of the electronic performance device.

FIG. 7 is a perspective view of an electronic drum applied to the electronic performance device.

FIG. 8 is a plan view of the electronic drum of FIG. 7.

FIG. 9 is a plan view in a state where a hitting surface of the electronic drum of FIG. 7 is removed.

FIG. 10 is a cross-sectional view taken along a line X-X in FIG. 8.

FIG. 11 is a cross-sectional view taken along a line XI-XI in FIG. 8.

FIG. 12 is a cross-sectional view taken along a line XII-XII in FIG. 8.

FIG. 13 is a graph representing the basic waveform data for the electronic drum of FIG. 7.

FIG. 14 is an enlarged view of an area a in FIG. 13.

FIG. 15 is a graph representing the differential data for the electronic drum of FIG. 7.

FIG. 16 is a graph representing waveform data and output waveform data for the electronic drum of FIG. 7.

FIG. 17 is a perspective view of an electronic cymbal applied to the electronic performance device of the present disclosure.

FIG. 18 is a plan view of the electronic cymbal of FIG. 17.

FIG. 19 is a plan view of a state where a surface of the electronic cymbal of FIG. 17 is removed.

FIG. 20 is a bottom plan view of a state where a cover of the electronic cymbal of FIG. 17 is removed.

FIG. 21 is an exploded perspective view of the electronic cymbal of FIG. 17 viewed from below.

FIG. 22 is an exploded perspective view of the electronic cymbal of FIG. 17 viewed from above.

FIG. 23 is a cross-sectional view taken along a line XXIII-XXIII in FIG. 18.

FIG. 24 is a cross-sectional view taken along a line XXIV-XXIV in FIG. 18.

FIG. 25 is a graph representing the basic waveform data for the electronic cymbal of FIG. 17.

FIG. 26 is an enlarged view of an area b in FIG. 25.

FIG. 27 is a graph representing the differential data for the electronic cymbal of FIG. 17.

FIG. 28 is a graph representing waveform data and output waveform data for the electronic cymbal of FIG. 17.

DETAILED DESCRIPTION

An embodiment of the present disclosure will be described in detail below with reference to the drawings.

An electronic performance device according to this embodiment is able to electronically produce hitting sounds and to output the produced sounds during a performance. As illustrated in FIG. 1, the electronic performance device includes a storage mechanism 1, a hitting portion R, a detection mechanism 2 and an output mechanism 3. The storage mechanism 1 is configured to previously store waveform data per level of hit strength obtained at the time of hitting a musical instrument. The hitting portion R is to be hit during the performance. The detection mechanism 2 is configured to detect a hit on the hitting portion R during the performance and to transmit a detection signal, related to at least the hit strength at the time of hitting. The output mechanism 3 is configured to output, the waveform data stored in the storage mechanism 1, and the waveform data corresponding to the hit strength indicated by the detection signal on condition of receiving the detection signal from the detection mechanism 2.

The electronic performance device according to this embodiment includes, as illustrated in FIG. 6, electronic drums R1 and electronic cymbals R2, for example. A player can play the electronic performance device by hitting, for example, a hitting surface R1*a* (see FIGS. 7 to 12) of each electronic drum R1 and a hitting surface R2*a* (see FIGS. 17 to 24) of each electronic cymbal R2 (those hitting surfaces R1*a* and R2*a* each corresponding to the hitting portion R in the present disclosure) with sticks or the likes.

The electronic performance device may be applied, in addition to percussion instruments such as the electronic drum R1 and the electronic cymbal R2, another type of electronic performance device generating attenuation sounds, for example, a keyboard instrument such as an electronic piano or a string instrument such an electronic guitar. For instance, when the electronic performance device is applied to the keyboard instrument, the hit strength is regarded as indicating key hit strength. When the electronic performance device is applied to the string instrument, the hit strength is regarded as indicating string picking or flipping strength.

The storage mechanism 1 includes a storage medium, such as a memory, that previously stores waveform data per level of hit strength at the time of hitting a particular musical instrument (i.e., a natural musical instrument generally called an acoustic musical instrument where sounds are to be reproduced) to which the electronic performance device is applied. The storage mechanism 1 is able to store basic waveform data (A to H) obtained per level of the hit strength as illustrated in FIG. 2. The basic waveform data (A to H) are each data indicating a sound wave that is generated upon the hitting and attenuates with the elapse of time as represented in FIG. 13 or 25 (i.e., a graph where a horizontal axis represents time, and a vertical axis represents sound volume).

The detection mechanism 2 includes vibration sensors attached to the hitting portion R of the electronic performance device. For instance, the detection mechanism 2 includes vibration sensors (R1*b* and R1*c*) (a head sensor and a rim sensor) attached inside the electronic drum R1. Additionally, it may include vibration sensor R1*d* (a side rim sensor) as illustrated in FIGS. 10 and 11, or vibration sensors R2*b*, R2*c* and R2*d* (a vibration sensor, a cup sensor, and an edge sensor) attached inside the electronic cymbal R2 as illustrated in FIGS. 20 to 24. The detection mechanism 2 is able to transmit, upon detecting the hit during the performance, the detection signal related to at least the hit strength at the time of hitting to the output mechanism 3. A sign tin FIGS. 10 and 11 denotes a cushion tape for elastically holding each of the vibration sensors (R1*b* and R1*c*).

The output mechanism 3 is electrically connected to the storage mechanism 1 and the detection mechanism 2 it is able to output the waveform data stored in the storage mechanism 1, the waveform data (output waveform data), as hitting sounds corresponding to the hit strength indicated by the detection signal through a speaker or the like on condition of receiving the detection signal from the detection mechanism 2. In other words, when the hitting portion R is hit during the performance, the output mechanism 3 can reproduce sounds of the musical instrument corresponding to the hit strength. The sounds are recorded (so-called sampling) and stored in advance.

A detailed structure of the electronic performance device will be described below.

As illustrated in FIGS. 7 to 12, the electronic drum R1 includes a mesh-like hitting surface R1*a* made of PET or nylon, a cylindrical shell 6 made of resin such as ABS or nylon, a lug 10 made of resin such as ABS or nylon, or an aluminum or zinc die casting, a side rim 5 made of resin such as ABS or nylon, a hoop 8 made of steel or a die casting, a steel-made plate 12, and hit sensors (R1*b* and R1*c*).

A hoop rubber 4, made of an elastomer such as EPDM rubber, is fixed to the hoop 8. In the shell 6, multiple lugs 10 are formed along a circumferential direction. The hitting surface R1*a* includes the hoop rubber 4 and the hoop 8 is fixedly held by tension bolts 7 that are attached to the lugs 10. In this embodiment, as illustrated in FIGS. 11 and 12, an outward bent end 6*a* and an inward bent end 6*b* are formed in an attachment portion of the shell 6 where the lug 10 is to be attached. Thus, rigidity can be ensured.

Inside the shell 6, as illustrated in FIGS. 9 to 12, multiple sensor placement portions s are formed extending from a circumferential edge toward a center in rotational symmetry about a center axis of the shell 6. The plate 12 is arranged in each of the sensor placement portions s. A head sensor cushion 9 is attached to the particular plate 12. As illustrated in FIGS. 11 and 12, the head sensor cushion 9 is fixed to the plate 12 while a tip of the head sensor cushion 9 is in abutment against the hitting surface R1*a*. The hit sensor R1*b* constitutes a head sensor capable of detecting a hit on the hitting surface R1*a*. It is attached between the head sensor cushion 9 and the plate 12. The hit sensor R1*c* constitutes a rim sensor capable of detecting a hit on the hoop rubber 4. It is attached below the plate 12.

With the above-described structure, the head sensor cushions 9 and the hit sensors (R1*b* and R1*c*) can be attached to desired positions inside the shell 6 (attached at positions of desired ones of the plates 12). The number and layouts of the sensors can be flexibly changed according to a model. An output jack J1 (see FIGS. 9 to 12) is attached to a particular position on the sensor placement portion s in such a fashion that positions of the output jack J1 and the plate 12 are replaceable with each other. A detection signal of the hit sensor R1*b* can be output from the output jack J1. A substrate of the output jack J1 also serves as a cover to hide internal wiring.

As illustrated in FIG. 11, the side rim 5 is attached to a predetermined position of the shell 6 and includes a side rib rubber 5*a* that the player can hit. The side rim 5 further includes a hit sensor R1*d*, constituting a side rim sensor, that can detect a hit on the side rim 5. An output jack J2 (side rim output jack) outputs a detection value detected by the hit sensor R1*d*. The side rim 5, in this embodiment, is attached to an outer circumferential surface of the shell 6 with a rubber bushing 11 interposed therebetween. Accordingly, detection of the hit by the hit sensor R1*d* (the side rim sensor) and detection of the hit by the hit sensors (R1*b* and R1*c*) (the head sensor and the rim sensor) can be reliably separated from each other.

As illustrated in FIGS. 17 to 24, the electronic cymbal R2 includes a surface 13, a frame 14 and a cover 16. The surface 13 is made of, for example, silicon rubber and constitutes the hitting surface R2*a*. The frame 14 is made of resin such as ABS or nylon. The cover 15 is made of, for example, EPDM rubber. The surface 13 is a section that the player can hit with sticks or the likes and, as illustrated in FIG. 17. Also, it includes a cup portion R2*aa,* a bow portion R2*ab,* and an edge portion R2*ac*.

A central region of the surface 13 is coupled to the frame 14 with a rubber bush bushing 16 interposed therebetween. Hits on the cup portion R2*aa,* the bow portion R2*ab,* and the edge portion R2*ac* are detected by hit sensors R2*b*, R2*c* and R2*d*, respectively. Detection signals of these sensors can be output from an output jack J3. The hit sensor R2*b* is a vibration sensor, and the hit sensors (R2*c* and R2*d*), the edge sensor and the cup sensor, are each formed as a sheet switch sensor.

In the electronic cymbal R2, in this embodiment as illustrated in FIG. 24, a curvature r2 of a circumferential edge portion of the frame 14, a portion near a region where the hit sensor R2*c* is disposed, is set to be greater than a curvature r1 of a region on an inner side of the circumferential portion of the surface 13, a region belonging to the bow portion R2*ab*. Accordingly, even when the player hits the edge portion R2*ac* at an angle close to a horizontal direction, the hit sensor R2*c* can reliably detect the hit. This is due to a placement angle of the hit sensor R2*c* relative to the horizontal direction that can be increased while a cross-sectional shape like that of the cymbal is maintained without excessively increasing the curvature r1.

Furthermore, as illustrated in FIGS. 21 and 24, the frame 14 in this embodiment includes a hook-shaped locking portion 14*a* formed in a region where the cover 15 is attached. The cover 15 is attached to the frame 14 by fitting a protrusion 15*a*, (see FIGS. 22 and 24) formed on the cover 15, with the locking portion 14*a*. As a result, compared with using screws or the like to fix the cover 15 to the frame 14, damages by the screws or the like, caused by hitting, can be more reliably avoided.

Here, the storage mechanism 1, in this embodiment, as illustrated in FIG. 2, stores the basic waveform data (A to H) corresponding to each level of strength of the hit on the musical instrument. Also, it stores an additional element that is produced based on waveform data extracted from sounds of the same musical instrument separately from the basic waveform data (A to H) and that is applicable to multiple levels of the hit strength (all the levels of the hit strength from a weak hit to a strong hit in this embodiment). The additional element in this embodiment is produced based on the differential data that is given by extracting a difference between two waveform data obtained at comparable hit strengths. In other words, the additional element is provided by extracting variation elements that are inherent to sounds generated by humans or natural musical instruments. The additional element is given as the waveform data such as waveform data ($\alpha$1) depicted in FIG. 15 or waveform data ($\alpha$2) depicted in FIG. 27, for example.

In more detail, the differential data in this embodiment is obtained, by way of example, as follows. When the hit strength has a level comparable to that of the basic waveform data point E, two waveform data points different from the basic waveform data point E (i.e., two waveform data points obtained when the same musical instrument is hit with the hit strength at levels comparable to that of the basic waveform data point E) are obtained. Thereafter the differential data is obtained by calculating a difference between values of those two waveform data points obtained at the same time. Then, the additional element is obtained by multiplying the calculated differential data by a predetermined coefficient. The output waveform data can be obtained by applying (adding or subtracting) the differential data to (to or from) the basic waveform data.

The predetermined coefficient can be given as a preset value or a value varying from time to time during the performance. For example, a value corresponding to a random number that is generated with the elapse of time. The predetermined coefficient may be set to 1. In such a case, the additional element is equal to the differential data. Therefore, the output waveform data can be obtained by applying (adding or subtracting) the differential data to (to or from) the basic waveform data.

For instance, basic waveform data h1 can be obtained, as illustrated in FIGS. 13 and 14, by hitting an acoustic drum corresponding to the electronic drum R1 at a predetermined level of the hit strength and recoding generated sounds. The differential data ai depicted in FIG. 15 is calculated based on the hit strength comparable to the above-mentioned hit strength. Then, the additional element can be obtained by multiplying the differential data $\alpha$1 by the predetermined coefficient. The output waveform data h2, analogous to the basic waveform data h1, can be obtained as illustrated in FIG. 16, by applying that additional element to the basic waveform data h1.

Moreover, basic waveform data h3 can be obtained, as illustrated in FIGS. 25 and 26, by hitting an acoustic cymbal (natural musical instrument) corresponding to the electronic cymbal R2 at a predetermined level of the hit strength and recoding generated sounds. The differential data $\alpha$2 depicted in FIG. 27 is calculated based on the hit strength comparable to the above-mentioned hit strength. Then, the additional element can be obtained by multiplying the differential data $\alpha$2 by the predetermined coefficient. The output waveform data h4, analogous to the basic waveform data h3, can be obtained as illustrated in FIG. 28, by applying that additional element to the basic waveform data h3.

Thus, when the hitting surface (R1*a* or R2*a*) as the hitting portion in the present disclosure is hit, the output waveform data obtained by adding the additional element to any of the basic waveform data (A to H), corresponding to a level of the hit strength at that time, can be output from the output mechanism 3. Accordingly, when the same hitting surface is finely hit repeatedly in a roll performance, for example, the output waveform data including variations inherent to sounds generated by the humans or the natural musical instruments are output. These output waveform data are analogous to each other, but not the same, and a situation of the same waveform data being monotonously output repeatedly can be avoided.

The storage mechanism 1 in this embodiment can produce the output waveform data by freely changing the timing to apply the additional element to the basic waveform data at the predetermined level of the hit strength, by shifting the timing to add or subtract the additional element. It is also possible to execute an envelope process that accompanies with an increase or a decrease of the sound volume, or a filtering process where the additional element is applied to only a predetermined sound range. Here, because the basic waveform data is not subjected to the envelope process or the filtering process, deterioration in texture of music sounds is minimized. As a result, a variety of analogous output waveform data can be produced while the sound texture is maintained, and waveform data with rich variations can be output.

The output mechanism 3 in this embodiment is able to output multiple output waveform data, produced by applying the additional element, at random or as per preset. In other words, the multiple output waveform data obtained by applying the different additional elements at the comparable hit strength can be produced and can be output at random in accordance with generated random numbers, for example, or as per preset.

A control process executed by the electronic performance device according to this embodiment will be described below with reference to a flowchart of FIG. 3.

First, when a hit on the hitting portion R is detected by the detection mechanism 2 (S1), whether the detected hit is effective is determined (S2). If it is determined that the detected hit is effective, the hit strength of the hit is calculated (S3). Then, whether the hit is a target where the differential data (additional element) is to be applied is determined (S4). If it is determined that the hit is the target where the differential data is to be applied, whether the filtering process is necessary is determined (S5). On that occasion, whether another process, such as the envelope process, is to be performed without being limited to the filtering process may also be determined.

Thereafter, whether the filtering process is to be performed is determined (S6). If it is determined that the filtering process is to be performed, the filtering process is performed (S7), and the differential data (additional element) is applied (S8). If it is determined that the filtering process is not to be performed, the differential data (additional element) is applied (S8) without performing the filtering process. Thus, the output waveform data is produced (S9). The output waveform data obtained as described above is output from the output mechanism 3.

An electronic performance device according to another embodiment of the present disclosure will be described below.

As in the above-described embodiment, the electronic performance device according to this embodiment is able to electronically produce hitting sounds and to output the produced sounds during a performance. As illustrated in FIG. 1, the electronic performance device includes a storage mechanism 1, a detection mechanism 2 and an output mechanism 3. The storage mechanism 1 is configured to previously store waveform data per level of hit strength at the time of hitting a musical instrument, a natural musical instrument corresponding to the electronic performance device. The detection mechanism 2 is configured to detect a hit on the hitting portion R during the performance and to transmit a detection signal, related to at least the hit strength at the time of hitting. The output mechanism 3 is configured to output the waveform data stored in the storage mechanism 1 and the waveform data corresponding to the hit strength indicated by the detection signal on condition of receiving the detection signal from the detection mechanism 2. It is to be noted that detailed description of similar components to those in the above-described embodiment is omitted.

Here, as illustrated in FIG. 4, the storage mechanism 1 in this embodiment stores multiple additional elements, two differential data α and β in this embodiment, and selects, one of the additional elements, the one being applied, according to the hit strength. In other words, as illustrated in FIG. 4, the storage mechanism 1 stores not only basic waveform data (A to H) corresponding to each level of strength of the hit on the musical instrument, but also the additional elements (the differential data α and β) that are produced based on waveform data extracted separately from the basic waveform data (A to H), and selects one of the additional elements, the one being applied, according to the hit strength.

In more detail, for a range where the hit strength is relatively weak, a range including the basic waveform data A and B, the output waveform data is produced by applying the additional element, obtained by multiplying the differential data α by a predetermined coefficient, to the basic waveform data A or the basic waveform data B. For a range where the hit strength is relatively strong, a range including the basic waveform data E to H, the output waveform data is produced by applying the additional element, obtained by multiplying the differential data β by a predetermined coefficient, to each of the basic waveform data (E to H). For a region where the hit strength is medium, a region including the basic waveform data C and D, the output waveform data is produced by applying the additional element, obtained by multiplying the differential data α by a predetermined coefficient, to the basic waveform data C or the basic waveform data D and then by further applying the additional element, obtained by multiplying the differential data β by a predetermined coefficient. Thus, as in the above-described embodiment, the additional elements in this embodiment can be applied to multiple levels of the hit strength, the region with strong hit strength, the region with weak hit strength, and the medium region between those two regions in this embodiment.

A control process executed by the electronic performance device according to this embodiment will be described below with reference to a flowchart of FIG. 5.

First, when a hit on the hitting portion R is detected by the detection mechanism 2 (S1), whether the detected hit is effective is determined (S2). If it is determined that the detected hit is effective, the hit strength of the hit is calculated (S3). Then, whether the hit is a target where the differential data (additional element) is to be applied is determined (S4). If it is determined that the hit is the target where the differential data is to be applied, whether the filtering process is necessary is determined (S5). On that occasion, as in the above-described embodiment, whether another process, such as the envelope process, is to be performed without being limited to the filtering process may also be determined.

Thereafter, a process of S5.5 to S8 (process regarding the differential data α) and a process of S11 to S14 (process regarding the differential data β) are executed in parallel. In the process regarding the differential data α, whether the differential data α is to be applied is determined (S5.5). If it is determined that the differential data α is to be applied, whether the filtering process is to be performed is determined (S6). If it is determined that the filtering process is to be performed, the filtering process is performed (S7), and the differential data α (additional element) is applied (S8). If it is determined that the filtering process is not to be performed, the differential data α (additional element) is applied (S8) without performing the filtering process. Thus, the output waveform data is produced (S9). The output waveform data obtained S10 as described above is output from the output mechanism 3.

On the other hand, in the process regarding the differential data β, whether the differential data β is to be applied is determined (S11). If it is determined that the differential data β is to be applied, whether the filtering process is to be performed is determined (S12). If it is determined that the filtering process is to be performed, the filtering process is performed (S13), and the differential data β (additional element) is applied (S14). If it is determined that the filtering process is not to be performed, the differential data β (additional element) is applied (S14) without performing the filtering process. Thus, the output waveform data is produced (S9). The output waveform data obtained S10 as described above is output from the output mechanism 3. If it is not determined in S5.5 that the differential data α is to be applied, or if it is not determined in S11 that the differential data B is to be applied, the control process goes to S10 while skipping S6 to S8 or S12 to S14.

According to the above-described embodiment, the storage mechanism 1 stores the basic waveform data corresponding to each level of the hit strength and the additional element that is produced based on waveform data extracted separately from the basic waveform data (A to H) and that is applicable to multiple levels of the hit strength. The output mechanism 3 outputs the output waveform data that is produced by applying the additional element to the basic waveform data. Thus, since the output waveform data is produced by applying the additional element regardless of the hit strength, monotony of the performance can be very naturally avoided while an amount of information of the waveform data to be stored and an editing work time are reduced.

Furthermore, since the additional element in this embodiment is produced based on the differential data that is given by extracting a difference between two waveform data obtained at comparable hit strengths, the output waveform data analogous to the basic waveform data can be easily produced. Particularly, in this embodiment, since a variation inherent to sounds, generated by humans or natural musical instruments, is extracted as a differential between the comparable hit strengths, the expression of music sounds can be naturally changed by applying such a differential to the basic waveform data and producing the output waveform data. Moreover, since the additional element in this embodiment is obtained by multiplying the differential data by the predetermined coefficient, variations of the produced output waveform data are increased. Thus, a more natural performance can be realized. Since only the differential data obtained by extracting the variation inherent to the sounds generated by the humans or the natural musical instruments is multiplied by the coefficient, the sound texture of the basic waveform data is maintained, and deterioration in sound texture of the output waveform data is minimized.

In addition, a variety of analogous output waveform data can be produced by, for the basic waveform data at a predetermined level of the hit strength, freely changing timing to apply the additional element, or by executing an envelope process that accompanies with an increase or a decrease of the sound volume, or a filtering process with which the additional element is applied to only a predetermined sound range. Therefore, the variations of the produced output waveform data can be further increased, and deterioration in texture of music sounds is remarkably suppressed in comparison with a method of executing the filtering process on the basic waveform data itself to give the variations. When the output mechanism 3 in the present disclosure is configured to be able to output multiple output waveform data, produced by applying the additional element, at random or as per preset, the appropriate output waveform data can be smoothly output during the performance.

According to the other embodiment of the present disclosure, the multiple additional elements are stored and one of the additional elements, the one being applied, is selected according to the hit strength. Thus, the appropriate output waveform data, corresponding to the hit strength, can be output. Any one of the multiple additional elements may be applied to the hit strength. For instance, different additional elements may be applied for all the levels of the hit strength (A to H).

The embodiments have been described above, but the present disclosure is not limited to those embodiments. For instance, the additional element is not limited to the one produced based on only the differential data and may be produced by utilizing a parameter related to the performance other than the basic waveform data. More specifically, the detection mechanism 2 may detect, in addition to the strength of a hit on the hitting portion R during the performance, a hit position of the hitting portion R, a time interval between hits (a time elapsed from the last hit), and/or a pressure applied to the hitting portion R, may obtain the additional element with at least one of the detected values being the parameter, and may produce and output the output waveform data. In the case of using, as the hitting portion R, electronic hi-hat cymbals where a top cymbal and a bottom cymbal are positioned to face each other to be movable between a contact state and a spaced state, the additional element may be set to be different depending on a distance between the top cymbal and the bottom cymbal.

The additional element in the present disclosure can provide a sufficient effect not only in the case of producing the additional element merely from waveform data recorded on the same musical instrument, but also in the case of producing the additional element from waveform data recorded on another very similar musical instrument. In another example, the additional element may be obtained based on waveform data recorded while the type and/or tension of the hitting surface of the musical instrument, the type and/or tension of a snare wire or a string, or recording equipment such as a pick, a hammer, or a microphone used in the performance is changed. As an alternative, the additional element may be obtained based on waveform data recorded on a similar musical instrument.

As long as an electronic performance device includes a storage mechanism configured to store basic waveform data corresponding to each level of strength of the hit on the musical instrument, and to further store an additional element that is produced based on waveform data extracted from sounds of the musical instrument separately from the basic waveform data and that is applicable to multiple levels of the hit strength, and an output mechanism configured to issue output waveform data that is produced by applying the additional element to the basic waveform data, the present disclosure can be applied to various electronic performance devices regardless of, for example, a difference in external shape of the electronic performance device, or whether one or more other functions are added to the electronic performance device.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electronic performance device comprising:

a storage mechanism configured to previously store waveform data per level of hit strength obtained at time of hitting a musical instrument;

a hitting portion to be hit during a performance;

a detection mechanism configured to detect a hit on the hitting portion during the performance and to transmit a detection signal, related to at least the hit strength at the time of hitting; and an output mechanism configured to output, the waveform data stored in the storage mechanism, and the waveform data corresponding to the hit strength indicated by the detection signal on condition of receiving the detection signal from the detection mechanism, the storage mechanism stores:

basic waveform data corresponding to multiple levels of strength of the single hit on the musical instrument; and at least one additional element that is produced based on waveform data extracted from sounds of the musical instrument separately from the basic waveform data and that is applicable to multiple levels of the hit strength, the additional element is produced based on differential data given by extracting a difference between two data waveforms obtained at comparable hit strengths, and the output mechanism outputs output waveform data that is produced by applying the additional element to the basic waveform data.

2. The electronic performance device according to claim 1, wherein the additional element is obtained by multiplying the differential data by a predetermined coefficient.

3. The electronic performance device according to claim 1, wherein a variety of analogous output data waveforms are produced by freely changing timing to apply the additional element to the basic data waveform at a predetermined level of the hit strength, or by executing an envelope process that accompanies with an increase or a decrease of a sound volume, or a filtering process where the additional element is applied to only a predetermined sound range.

4. The electronic performance device according to claim 1, wherein the output mechanism is configured to output multiple output data waveforms, produced by applying the additional element.

5. The electronic performance device according to claim 1, wherein the detection mechanism detects various parameters different from the strength of the hit on the hitting portion during the performance, the parameters including a hit position of the hitting portion, a time interval between hits, and a pressure applied to the hitting portion, and the detection mechanism obtains the additional element based on at least one of detected values, and produces the output data waveform.

6. The electronic performance device according to claim 1, wherein the storage mechanism stores multiple additional elements and selects one of the additional elements, the one being applied, according to the strength of the hit on the hitting portion.

* * * * *